(12) United States Patent
Tanaka et al.

(10) Patent No.: US 11,447,929 B2
(45) Date of Patent: Sep. 20, 2022

(54) CONSTRUCTION MACHINE

(71) Applicant: KOBELCO CONSTRUCTION MACHINERY CO., LTD., Hiroshima (JP)

(72) Inventors: Kiyokazu Tanaka, Tokyo (JP); Reona Takamura, Tokyo (JP)

(73) Assignee: KOBELCO CONSTRUCTION MACHINERY CO., LTD., Hiroshima (JP)

(*) Notice: Subject to any disclaimer, the term of this patent is extended or adjusted under 35 U.S.C. 154(b) by 324 days.

(21) Appl. No.: 16/764,225

(22) PCT Filed: Dec. 4, 2018

(86) PCT No.: PCT/JP2018/044469
§ 371 (c)(1),
(2) Date: May 14, 2020

(87) PCT Pub. No.: WO2019/124043
PCT Pub. Date: Jun. 27, 2019

(65) Prior Publication Data
US 2020/0385957 A1    Dec. 10, 2020

(30) Foreign Application Priority Data
Dec. 20, 2017 (JP) .............................. JP2017-244192

(51) Int. Cl.
*E02F 1/00* (2006.01)
*E02F 9/20* (2006.01)
(Continued)

(52) U.S. Cl.
CPC .............. *E02F 9/205* (2013.01); *E02F 3/964* (2013.01); *E02F 9/123* (2013.01); *E02F 9/2004* (2013.01);
(Continued)

(58) Field of Classification Search
None
See application file for complete search history.

(56) References Cited

U.S. PATENT DOCUMENTS 7,532,967 B2 * 5/2009 Fujishima ............... E02F 9/265
701/50
7,912,612 B2 * 3/2011 Janardhan ............. B25J 9/1638
37/413
(Continued)

FOREIGN PATENT DOCUMENTS

CN       102304932 A       1/2012
CN       104302848 A       1/2015
(Continued)

OTHER PUBLICATIONS

Extended European Report dated Mar. 15, 2021 in European Patent Application No. 188923980.8 10 pages.
(Continued)

*Primary Examiner* — Jonathan M Dager
(74) *Attorney, Agent, or Firm* — Oblon, McClelland, Maier & Neustadt, L.L.P.

(57) ABSTRACT

The construction machine includes: an input interface which permits an input of a provisional target position of the attachment in a virtual space; a target position calculation part which calculates an actual target position that is a target position of the attachment in a real space from the provisional target position; an operational amount calculation part which calculates an operational amount required to make a current position of the attachment coincide with the actual target position of the attachment coincide with the actual target position with respect to at least one driven target selected from a lower traveling body, an upper slewing body, a working device, and the attachment; and a control part which controls an operation of one of the actuators for
(Continued)

driving the driven target in accordance with the calculated target operational amount.

16 Claims, 20 Drawing Sheets

(51) Int. Cl.
    *E02F 3/96*     (2006.01)
    *E02F 9/12*     (2006.01)
    *E02F 9/22*     (2006.01)
    *E02F 9/26*     (2006.01)
    *G01B 11/24*     (2006.01)

(52) U.S. Cl.
    CPC ............ *E02F 9/2271* (2013.01); *E02F 9/262* (2013.01); *G01B 11/24* (2013.01)

(56) References Cited

U.S. PATENT DOCUMENTS

| | | | |
|---|---|---|---|
| 8,145,355 B2 * | 3/2012 | Danko | B25J 9/1651 700/262 |
| 8,903,689 B2 * | 12/2014 | Dunbabin | E02F 9/265 703/6 |
| 8,924,094 B2 * | 12/2014 | Faivre | G01G 19/083 172/465 |
| 9,157,216 B2 * | 10/2015 | Seki | G01S 19/23 |
| 9,540,789 B2 * | 1/2017 | Urbanowicz | E02F 3/32 |
| 9,644,346 B2 * | 5/2017 | Seki | E02F 3/435 |
| 9,752,298 B2 * | 9/2017 | Nakamura | E02F 9/2029 |
| 9,797,111 B2 * | 10/2017 | Kami | E02F 9/2033 |
| 9,828,747 B2 * | 11/2017 | Arimatsu | E02F 9/26 |
| 10,017,913 B2 * | 7/2018 | Iwamura | E02F 3/3677 |
| 10,234,368 B2 * | 3/2019 | Cherney | G01N 9/02 |
| 10,301,794 B2 * | 5/2019 | Moriki | E02F 3/32 |
| 10,323,388 B2 * | 6/2019 | Kanari | E02F 9/264 |
| 10,480,541 B2 * | 11/2019 | Bellows | F15B 11/20 |
| 10,635,258 B2 * | 4/2020 | Hokkanen | G06Q 50/08 |
| 10,668,854 B2 * | 6/2020 | Imaizumi | B60R 11/00 |
| 10,704,228 B2 * | 7/2020 | Tsuji | E02F 9/2045 |
| 10,794,037 B2 * | 10/2020 | Hokkanen | E02F 9/262 |
| 10,794,047 B2 * | 10/2020 | Arimatsu | E02F 9/261 |
| 10,934,688 B2 * | 3/2021 | Nishi | E02F 3/32 |
| 10,954,655 B2 * | 3/2021 | Ohiwa | E02F 9/26 |
| 11,047,109 B2 * | 6/2021 | Frank | G01F 22/00 |
| 11,072,908 B2 * | 7/2021 | Bolz | E02F 9/261 |
| 11,072,911 B2 * | 7/2021 | Li | E02F 9/205 |
| 11,078,647 B2 * | 8/2021 | Morimoto | E02F 3/435 |
| 11,105,072 B2 * | 8/2021 | Ohiwa | B60K 35/00 |
| 11,124,942 B2 * | 9/2021 | Faivre | E02F 9/205 |
| 11,142,883 B2 * | 10/2021 | Izumikawa | E02F 9/2004 |
| 11,214,939 B2 * | 1/2022 | Remmelmann | E02F 3/422 |
| 11,230,823 B2 * | 1/2022 | Tsukamoto | E02F 9/264 |
| 11,230,824 B2 * | 1/2022 | Narikawa | E02F 3/437 |
| 11,230,825 B2 * | 1/2022 | Takahama | E02F 9/261 |
| 11,236,492 B1 * | 2/2022 | Ready-Campbell | E02F 9/267 |
| 11,280,062 B2 * | 3/2022 | Takahama | H04Q 9/00 |
| 11,292,700 B2 * | 4/2022 | Lyngbäck | B66C 13/46 |
| 11,319,695 B2 * | 5/2022 | Yamamoto | E02F 9/262 |
| 2001/0023766 A1 | 9/2001 | Ohtomo et al. | |
| 2003/0001751 A1 * | 1/2003 | Ogura | E02F 9/2296 340/425.5 |
| 2007/0010925 A1 * | 1/2007 | Yokoyama | E02F 9/261 37/413 |
| 2008/0180523 A1 * | 7/2008 | Stratton | G09B 9/048 348/114 |
| 2011/0311342 A1 * | 12/2011 | Montgomery | E02F 9/264 414/685 |
| 2012/0130599 A1 * | 5/2012 | Faivre | E02F 9/265 701/50 |
| 2013/0261885 A1 | 10/2013 | Hargrave, Jr. et al. | |
| 2013/0261903 A1 | 10/2013 | Hargrave, Jr. et al. | |
| 2013/0346127 A1 * | 12/2013 | Jensen | G06Q 10/06 701/1 |
| 2014/0099178 A1 * | 4/2014 | Nomura | E02F 3/30 414/685 |
| 2014/0316665 A1 | 10/2014 | Hargrave, Jr. et al. | |
| 2014/0354813 A1 * | 12/2014 | Ishimoto | E02F 9/261 348/148 |
| 2015/0218781 A1 * | 8/2015 | Nomura | E02F 3/435 345/589 |
| 2015/0308081 A1 * | 10/2015 | Takaura | E02F 3/437 701/50 |
| 2015/0376868 A1 * | 12/2015 | Jackson | E02F 3/43 701/50 |
| 2016/0010312 A1 * | 1/2016 | Kurihara | E02F 9/2012 701/36 |
| 2016/0193920 A1 * | 7/2016 | Tsubone | E02F 9/16 701/36 |
| 2016/0251834 A1 * | 9/2016 | Arimatsu | E02F 3/435 414/687 |
| 2017/0028922 A1 * | 2/2017 | Matsuo | G06V 20/56 |
| 2018/0016771 A1 * | 1/2018 | Izumikawa | E02F 9/264 |
| 2018/0051446 A1 * | 2/2018 | Yoshinada | E02F 9/261 |
| 2018/0094408 A1 * | 4/2018 | Shintani | E02F 9/26 |
| 2018/0210454 A1 * | 7/2018 | Ready-Campbell | G05D 1/0274 |
| 2018/0245316 A1 * | 8/2018 | Forcash | E02F 1/00 |
| 2018/0274210 A1 * | 9/2018 | Nishimura | E02F 3/435 |
| 2019/0017249 A1 * | 1/2019 | Uji | G07C 5/02 |
| 2019/0218754 A1 * | 7/2019 | Izumikawa | B60R 1/00 |
| 2019/0226175 A1 * | 7/2019 | Mairet | E02F 3/422 |
| 2020/0032490 A1 * | 1/2020 | Ready-Campbell | E02F 9/262 |
| 2020/0087893 A1 * | 3/2020 | Hageman | E02F 9/20 |
| 2020/0157775 A1 * | 5/2020 | Sawodny | E02F 9/2029 |
| 2020/0291608 A1 * | 9/2020 | Ready-Campbell | E02F 9/265 |
| 2021/0156121 A1 * | 5/2021 | Hayakawa | G06T 7/70 |
| 2021/0230841 A1 * | 7/2021 | Kurosawa | E02F 9/2033 |
| 2021/0246625 A1 * | 8/2021 | Oi | E02F 9/26 |
| 2021/0262190 A1 * | 8/2021 | Ito | E02F 3/437 |
| 2021/0262195 A1 * | 8/2021 | Nishi | G06F 3/14 |
| 2021/0262196 A1 * | 8/2021 | Ito | E02F 3/32 |
| 2022/0010519 A1 * | 1/2022 | Izumikawa | E02F 9/2228 |
| 2022/0010520 A1 * | 1/2022 | Sano | E02F 9/265 |

FOREIGN PATENT DOCUMENTS

| | | |
|---|---|---|
| JP | 9-177135 A | 7/1997 |
| JP | 2000-291048 A | 10/2000 |
| JP | 2001-255146 A | 9/2001 |
| JP | 2005-61024 A | 3/2005 |
| JP | 4311577 B2 | 8/2009 |
| JP | 2014-129676 A | 7/2014 |
| WO | WO 2005/024144 A1 | 3/2005 |
| WO | WO 2016/158539 A1 | 10/2016 |

OTHER PUBLICATIONS

Japanese Office Action dated May 18, 2021 in Japanese Patent Application No. 2017-244192 (with English translation), 10 pages.
International Search Report dated Feb. 12, 2019 in PCT/JP2018/044469 filed Dec. 4, 2018, 1 page.
Combined Chinese Office Action and Search Report dated Jan. 19, 2022 in Chinese Patent Application No. 201880075811.4 (with English summary), 10 pages.
Combined Chinese Office action and Search Report dated Jul. 12, 2021 in corresponding Chinese Patent Application No. 201880075811.4 (with English Translation and and English Translation of Category of Cited Documents), 18 pages.

* cited by examiner

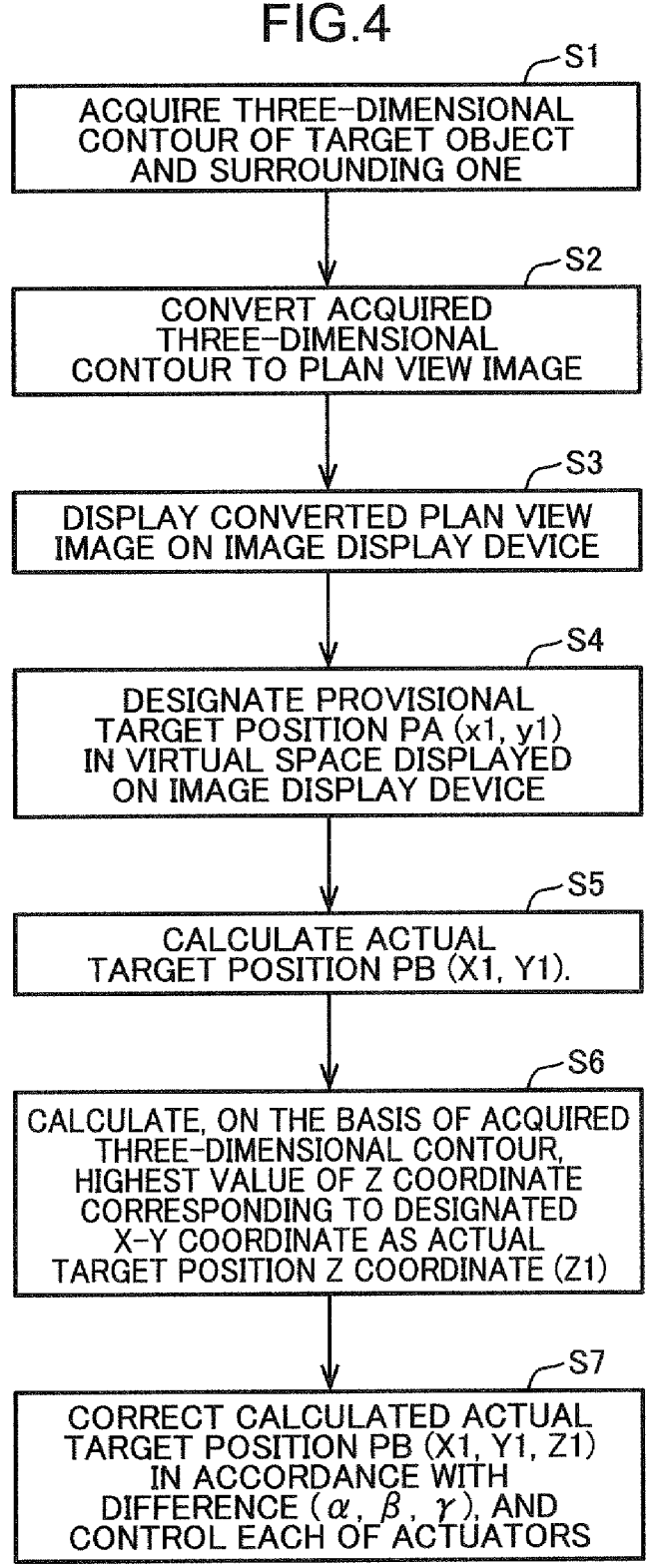

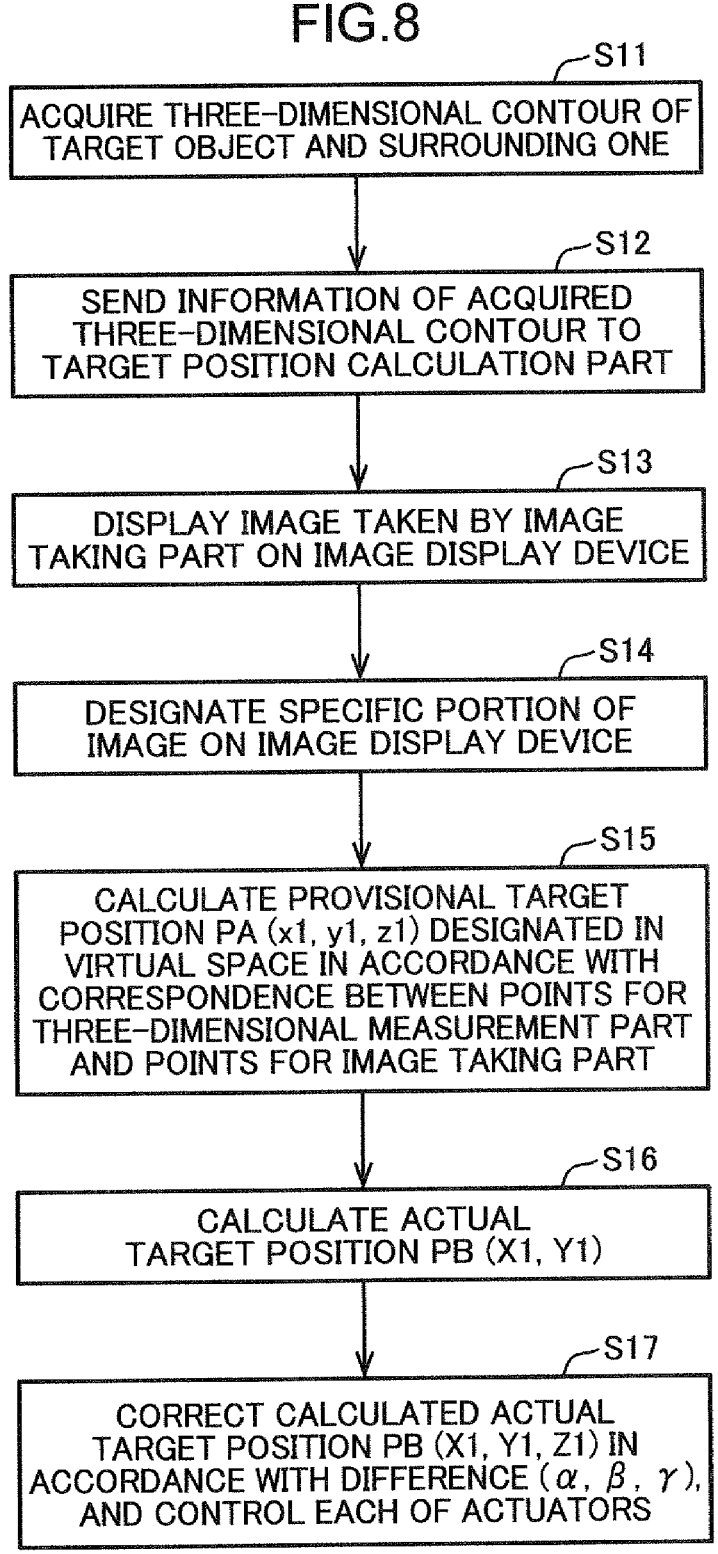

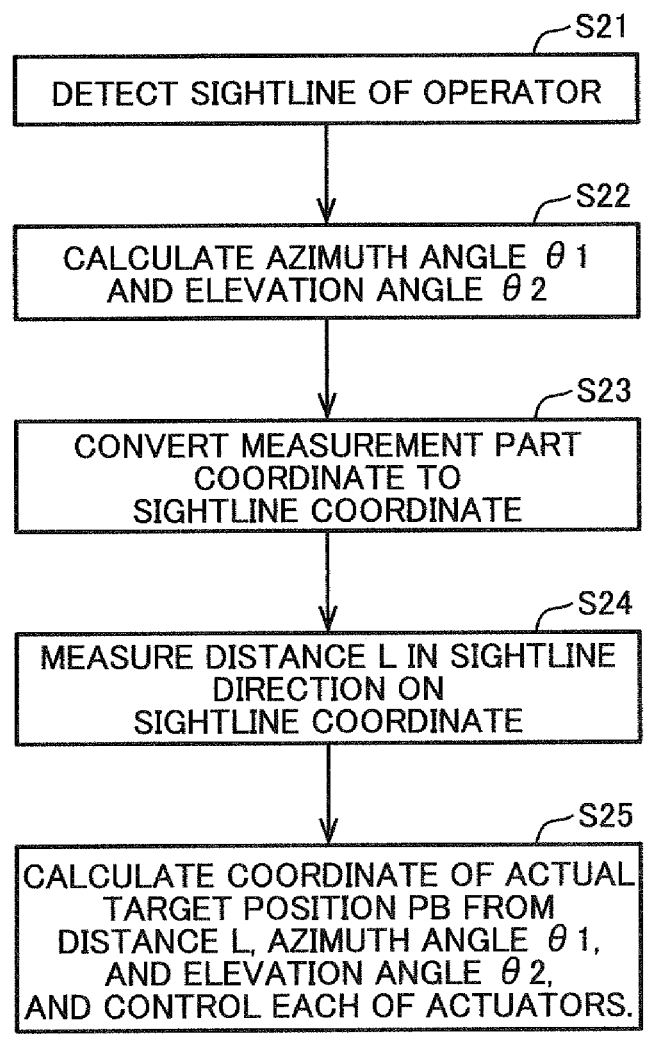

CONSTRUCTION MACHINE

TECHNICAL FIELD

The present invention relates to a construction machine, such as a hydraulic excavator, which can perform an operative assistance enabling an attachment to move easily and rapidly to a target position.

BACKGROUND ART

In a construction machine such as a hydraulic excavator, an operator in an operating chamber confirms a current position of an attachment and a target position that is a destination to which the attachment moves, and performs in a working site a manual operation of moving an upper slewing body, a working device (a boom, an arm), an attachment and the like by handling corresponding operational parts.

The working site is provided with a mark for instructing, to the operator of the construction machine, a specific position which needs construction, i.e., excavation. The operator proceeds with the operation of the construction machine for making the leading end of the attachment to coincide with the mark. However, a longer distance from the attachment to the mark leads to more difficult recognition of the target position, consequently causing a deviation from the target position to likely occur. As a solution for such deviation, there has been known a construction machine which can perform an operative assistance of providing the operator with information for simplifying the operation after automatically measuring a shape of a construction surface and a marked position.

For example, Patent Literature 1 discloses a construction machine including a laser distance measurement device provided in an operating chamber, a calculation device, and a display device. The laser distance measurement device automatically measures a shape of a construction surface and a marked position. The calculation device calculates a virtual line corresponding to a target surface to be formed on the basis of a mark located near the construction surface, and causes the display device to display a cross-sectional image showing positions of the construction surface and the virtual line. In this manner, the operator can grasp the positional relationship between the construction surface and the target surface (virtual line), and thus can handle the construction machine, using as a guide the virtual line cross-sectionally displayed on the display device.

Although the construction machine disclosed in Patent Literature 1 includes the display device which displays the construction surface and the target surface (virtual line), the operator must handle relevant operational parts in a conventional manner to actually manipulate working devices (a boom, an arm) and the attachment of the construction machine. In the end, the operation depends on the handling technique of the operator.

CITATION LIST

Patent Literature

Patent Literature 1: Japanese Patent Publication No. 4311577

SUMMARY OF INVENTION

In view of the aforementioned problems, the present invention has an object of providing a construction machine, such as a hydraulic excavator, which can perform an operative assistance enabling an attachment to move easily and rapidly to a target position.

A provided construction machine includes: a lower traveling body; a traveling drive device which is an actuator for driving the lower traveling body in such a way as to cause the lower traveling body to perform a traveling action; an upper slewing body slewably mounted on the lower traveling body; a slewing motor which is an actuator for slewing the upper slewing body; a working device swingably coupled to the upper slewing body; an attachment coupled to a leading end of the working device; a plurality of working actuators which are actuators for driving the attachment and the working device respectively; an input interface which permits an input of designating a provisional target position of the attachment in a virtual space; a target position calculation part which calculates an actual target position that is a target position of the attachment in a real space by using the provisional target position corresponding to the input permitted by the input interface; an operational amount calculation part which calculates a target operational amount that is an operational amount required to make a current position of the attachment coincide with the actual target position with respect to at least one driven target selected from the lower traveling body, the slewing body, the working device, and the attachment; and a control part which controls an operation of an actuator for driving the driven target among the traveling drive device, the slewing motor, and the plurality of working actuators in accordance with the target operational amount calculated by the operational amount calculation part.

BRIEF DESCRIPTION OF DRAWINGS

FIG. 4 is a flowchart showing an arithmetic control executed by the arithmetic control system according to the first embodiment.

FIG. 5B shows an instructive operation made onto an image of the target object shown in

FIG. 5A.

FIG. 8 is a flowchart showing an arithmetic control executed by the arithmetic control system according to the second embodiment.

FIG. 9B shows an instructive operation made onto an image of the target object shown in

FIG. 9A.

FIG. 12 is a flowchart showing an arithmetic control executed in the comparative form.

DESCRIPTION OF EMBODIMENTS

A construction machine 10 according to each of the embodiments of the present invention will be described with reference to the accompanying drawings. It should be noted here that with respect to the construction machine 10, for convenience, a left and right direction on a horizontal plane is defined as an X-axis direction, a front and rear direction on the horizontal plane is defined as a Y-axis direction, and a vertical direction (up and down direction) is defined as a Z-axis direction, and further respective positions will be described by using the (X, Y, Z) coordinate.

Figure 1:
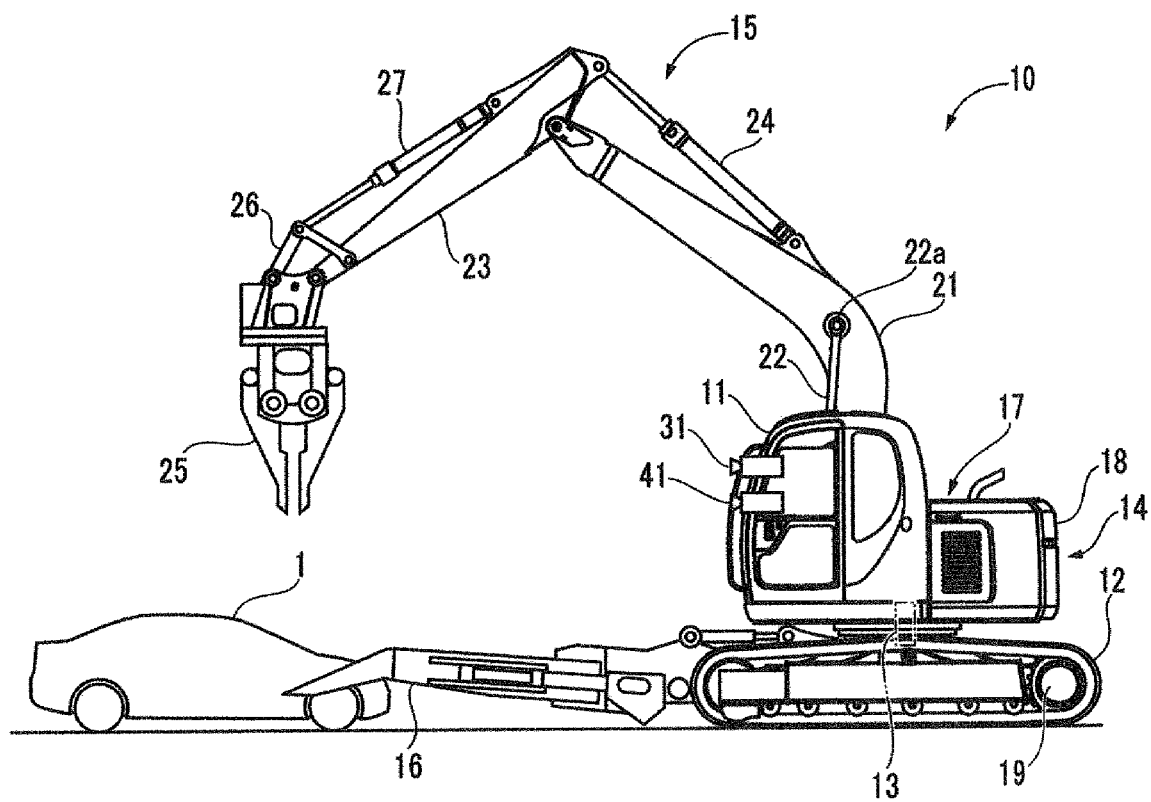
FIG. 1 is a side view of a construction machine according to first and second embodiments of the present invention.
Figure 2:
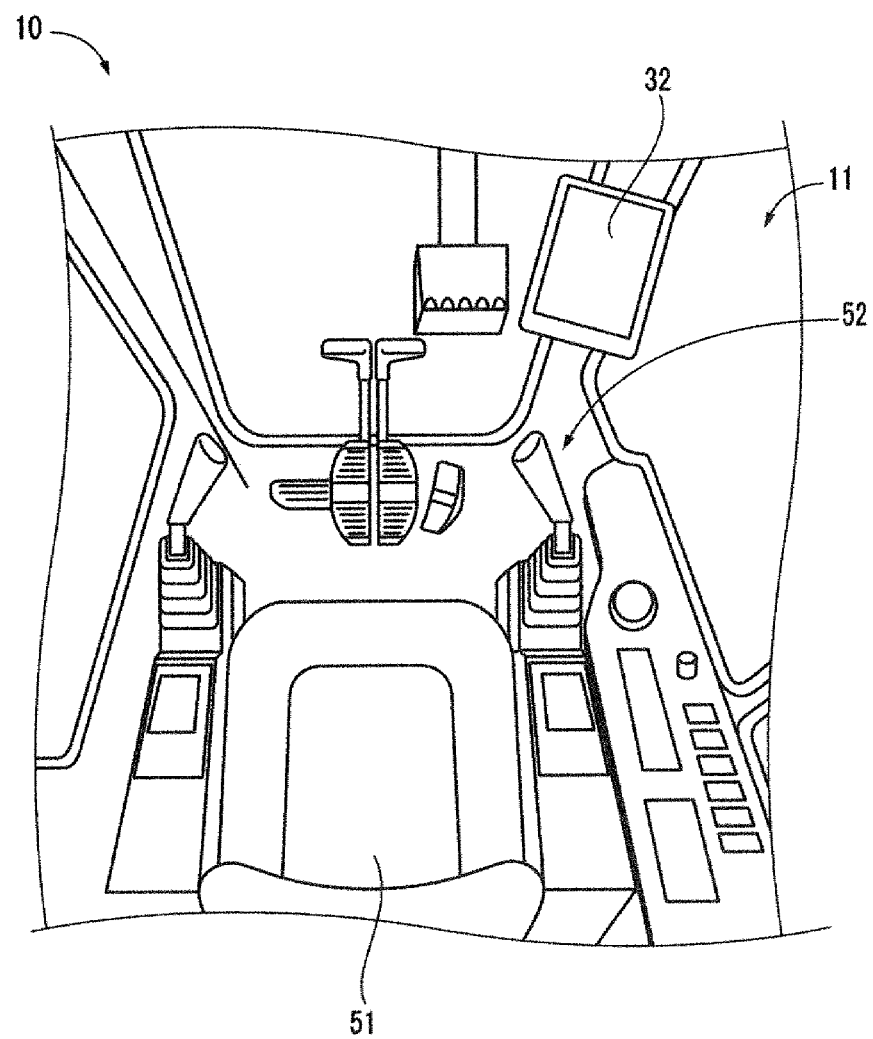
FIG. 2 is a perspective view showing an internal part of an operating chamber of the construction machine shown in FIG. 1.

FIG. 1 shows the construction machine 10 according to each of the first and second embodiments of the present invention. The construction machine 10 is, for example, a demolisher, and includes: a lower traveling body 12 driven by a traveling drive device 19 to perform a traveling action; an upper slewing body 14 mounted on the lower traveling body 12 slewably via a slewing shaft 13; a slewing motor 28 (FIG. 3) which is an actuator for driving the upper slewing body 14 to slew; a working device 15 coupled to the upper stewing body 14 swingably in a vertical direction; a clamp arm 16 attached to the lower traveling body 12; a crusher 25 which is a leading end attachment; and a plurality of working actuators which drive the working device 15. The upper slewing body 14 is mounted with an operating chamber (cab) 11 at a laterally front part thereon, and an engine and a counterweight 18 arranged in a machine chamber 17 at a rear part thereof.

The working device 15 includes a boom 21 and an arm 23. The plurality of working actuators include a boom cylinder 22 for vertically swinging the boom 21 with respect to the upper slowing body 14, and an arm cylinder 24 for vertically swinging the arm 23 with respect to the boom 21. The boom 21 and the boom cylinder 22 are hinged to the upper slewing body 14 in such a manner as to be Vertically swingable. The boom cylinder 22 has a distal end rotatably coupled to the boom 21 via a pin 22a. The arm 23 is hinged to a distal end of the boom 21, and is coupled to the arm cylinder 24 so as to be swung by the arm cylinder 24.

The construction machine 10 further includes a crusher cylinder 27 which is an actuator for driving the crusher 25 which is the leading end attachment in the embodiment. The crusher 25 is connected with the arm 23 and the crusher cylinder 27 via a link part 26 in such a manner as to be vertically swingable by the crusher cylinder 27 with respect to the arm 23.

The construction machine 10 further includes a three-dimensional measurement part 31 and an image display device 32. The three-dimensional measurement part 31 is placed at a fixed position and a fixed posture to the upper slewing body 14, and acquires distance information about a distance from the three-dimensional measurement part 31 to each of a plurality of points on a surface of a target object 1 existing around the construction machine 10. The image display device 32 is provided in the operating chamber 11, and three-dimensionally displays an image of the target object 1 and surrounding images formed on the basis of the distance information acquired by the three-dimensional measurement part 31. The image is an image representing a "virtual space" of the present invention.

The operating chamber 11 is installed with a seat 51 and an operational part 52 in addition to the image display device 32 therein. The seat 51 permits the operator to sit thereon to perform operations. The operational part 52 locates in front of the seat 51, and includes an operative lever and the like for receiving each operation by the operator to move the construction machine 10. The image display device 32 may include a touch panel which has a screen surface allowing the operator to perform a touch action thereon. Moreover, the present invention should not be limited to a three-dimensional measurement part placed at a fixed position and a fixed posture to the upper slewing body 14, like the three-dimensional measurement part 31 in this embodiment. For instance, the three-dimensional measurement part 31 may be placed at a fixed position and a fixed posture to a specific location around the construction machine 10. In an exemplary case that the body of the construction machine 10 is arranged in a demolition factory, the three-dimensional measurement part 31 may be suspended from a ceiling of the demolition factory independently from the body.

Figure 3:
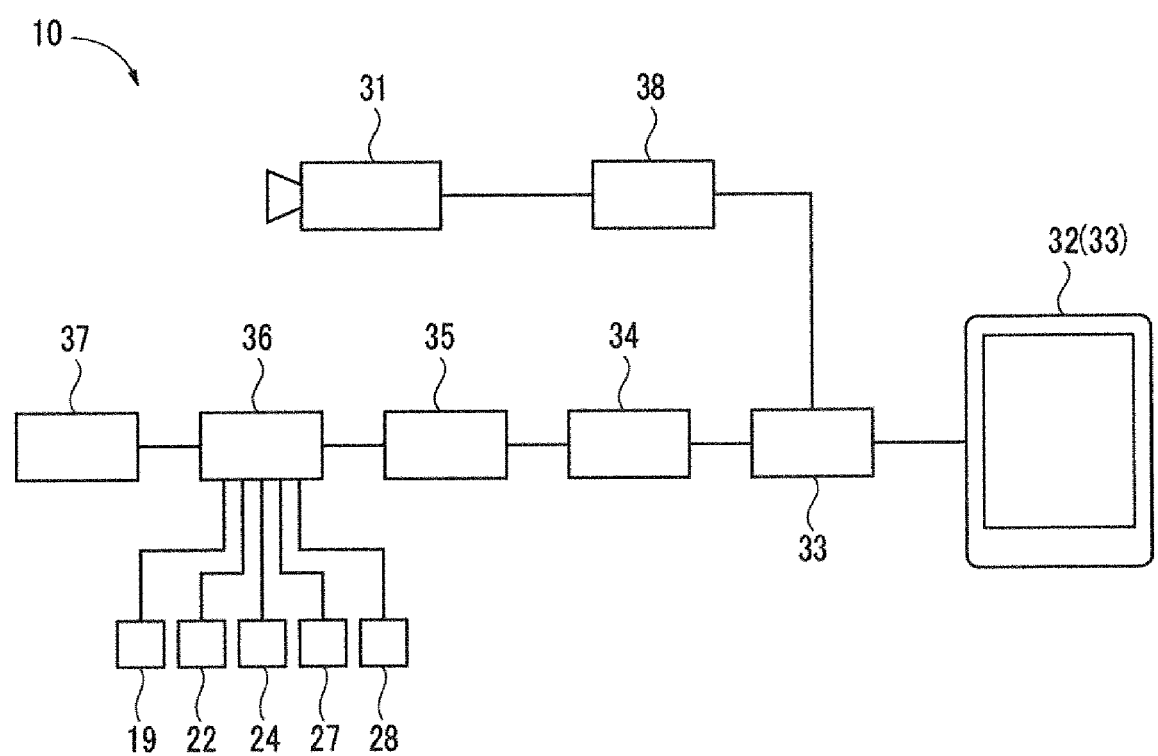
FIG. 3 is a block diagram showing an arithmetic control system of the construction machine according to the first embodiment.

FIG. 3 is a block diagram showing structural components constituting the arithmetic control system among the structural components of the construction machine 10. The construction machine 10 further includes, as shown in FIG. 3, an input interface 33, a target position calculation part 34, an operational amount calculation part 35, a control part 36, a storage part 37, and a display control part 38.

The input interface 33 is connected with the target position calculation part 34 for permitting an input of a provisional target position PA (see FIG. 6A) that is a target position of the leading end of the crusher (attachment) 25 in the virtual space to the target position calculation part 34 by a specific designative operation of the operator. The target position calculation part 34 calculates an actual target position PB (see FIG. 6B) that is a target position of the crusher 25 in a real space by using the provisional target position PA input thereto through the input interface 33. The operational amount calculation part 35 calculates a target operational amount that is an operational amount of at least one driven target selected from the lower traveling body 12, the upper slewing body 14, the working device 15, and the crusher 25 to make a current spatial position that is an current position of the crusher 25 in the real space coincide with the actual target position PB with respect to the at least one driven target. The control part 36 controls an operation of a control target actuator that is one of the actuators for driving the driven target among the traveling drive device 19, the slewing motor 28, and the plurality of actuators 22, 24, 27 in accordance with the target operational amount calculated by the operational amount calculation part 35.

The construction machine 10 further includes the storage part 37 which stores machine body information about a machine body thereof. The control part 36 corrects a control amount corresponding to the target operational amount of the control target actuator on the basis of the machine body information stored in the storage part 37. The machine body information includes a weight and a gravity center of the machine body, and a dimension of the working device 15.

The storage part 37 further stores a difference for use in calculation of the target position. The target position calculation part 34 corrects a value of the actual target position PB in accordance with the difference. The difference represents an amount corresponding to a difference between a value of the actual target position PB before the correction and another value thereof after the correction. For example, the difference can be designated by the operator as well as the provisional target position PA through the input interface 33. The storage part 37 can further store information, e.g., a plurality of types of working content, in addition to the difference. The difference may be determined for each of the plurality of types of working content.

The construction machine 10 further includes the display control part 38. The display control part 38 causes, on the basis of the distance information acquired by the three-dimensional measurement part 31, the image display device 32 to three-dimensionally display an image of the target object 1 (see FIG. 1). The image display device 32 may be integrated in the input interface 33, that is, serve as the input interface 33, may be one of the constituent elements of the input interface 33, or may be a structural component connected with the input interface 33 independently therefrom. The image display device 32 may be made of a dedicated monitor, or a so-called tablet. In the case of the tablet, the image display device 32 is easily connectable with the input interface 33.

Next, an arithmetic control executed by the above-described arithmetic control system will be described with reference to the flowchart shown in FIG. 4. In step S1 shown in FIG. 4, the three-dimensional measurement part 31 acquires distance information about a distance to each of a plurality of points on a surface of a target object 1 and surrounding one, and the display control part 38 acquires a three-dimensional contour of the target object 1 and the surrounding one on the basis of the distance information. The display control part 38 converts, in step S2, the acquired three-dimensional contour of the target object 1 and the surrounding one to a plan view image.

The display control part 38 causes, in step S3, the image display device 32 to display the plan view image after the conversion. In a case that the three-dimensional measurement part 31 is arranged directly above the target object 1, the three-dimensional contour can be displayed as the plan view image on the image display device 32 without being converted thereto.

Figure 6A:
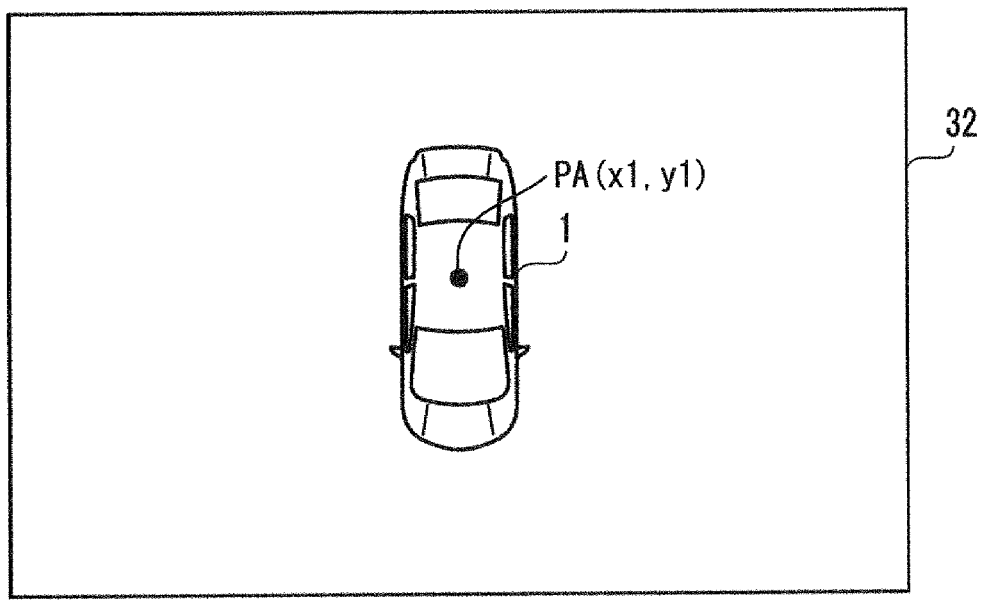
FIG. 6A is a plan view showing a provisional target position that is a target position of a crusher in a virtual space designated in the first embodiment.

Designated in step S4 is a planar coordinate, i.e., an X-Y coordinate (x1, y1), of the provisional target position PA that is the target position of the crusher 25 in the virtual space shown in FIG. 6A on the image of the target object 1 in the machine coordinate system as displayed in a plan view on the image display device 32. In step S5, the target position calculation part 34 calculates, on the basis of the provisional target position PA input through the input interface 33, another planar coordinate, i.e., an X-Y coordinate (X1, Y1), of the actual target position PB that is a target position of the leading end of the crusher 25 in the real space in the machine coordinate system shown in FIG. 6B.

In step S6, the target position calculation part 34 calculates, on the basis of the three-dimensional contour acquired in the aforementioned manner, a Z coordinate (Z1), corresponding to the actual target position PB (X1, Y1), in a height direction. The target position calculation part 34 in this embodiment further corrects, in step S7, a value of the actual target position PB (X1, Y1, Z1) in accordance with a difference ($\alpha$, $\beta$, $\gamma$) stored in the storage part 37.

The operational amount calculation part 35 calculates a target operational amount that is an operational amount of the current crusher 25, which is a selected driven target, required to make a current position of the crusher 25 in the real space coincide with the actual target position PB. The control part 36 calculates a control amount corresponding to the target operational amount for the control target actuator which is an actuator for driving the driven target among the actuators 19, 22, 24, 27, 28. The control part 36 further controls the control target actuator in accordance with the control amount to move the leading end of the crusher 25.

The correction of the actual target position using the difference may be omitted. In the case of the correction using the difference, the operator in this embodiment can directly designate the difference through the input interface 33. Alternatively, in the case that the storage part 37 stores a plurality of types of working content and the difference is determined for each of the plurality of types of working content, the input interface 33 permits input about at least the plurality of types of working content. This configuration makes it possible to automatically execute correction in accordance with a preferable difference corresponding to a specific type of working content by permitting the operator to only select the specific type of working content among the plurality of types of working content suitably for an associated working operation.

Subsequently, actions of the construction machine 10 that are in accordance with the above-described arithmetic control will be described.

Figure 5A:
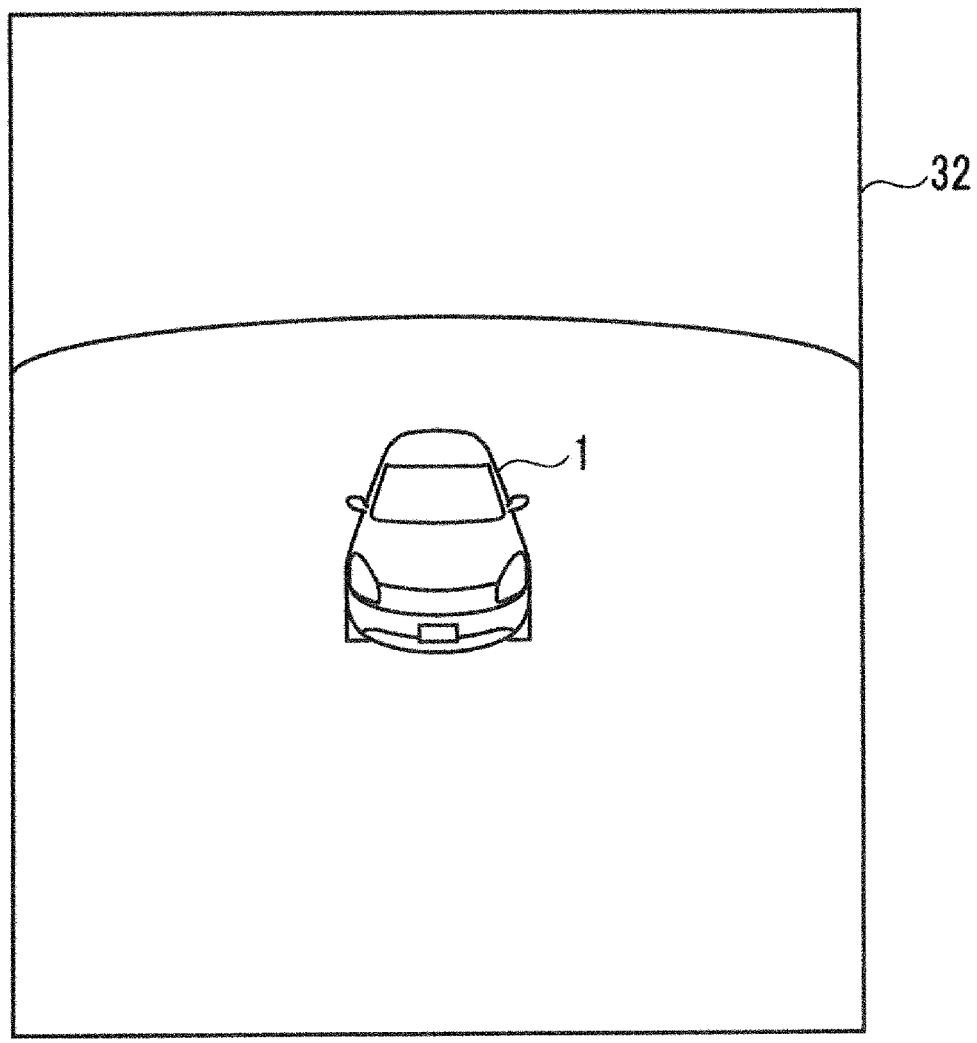
FIG. 5A is a view showing a perspective image of a target object displayed on an image display device according to the first embodiment.
Figure 5B:
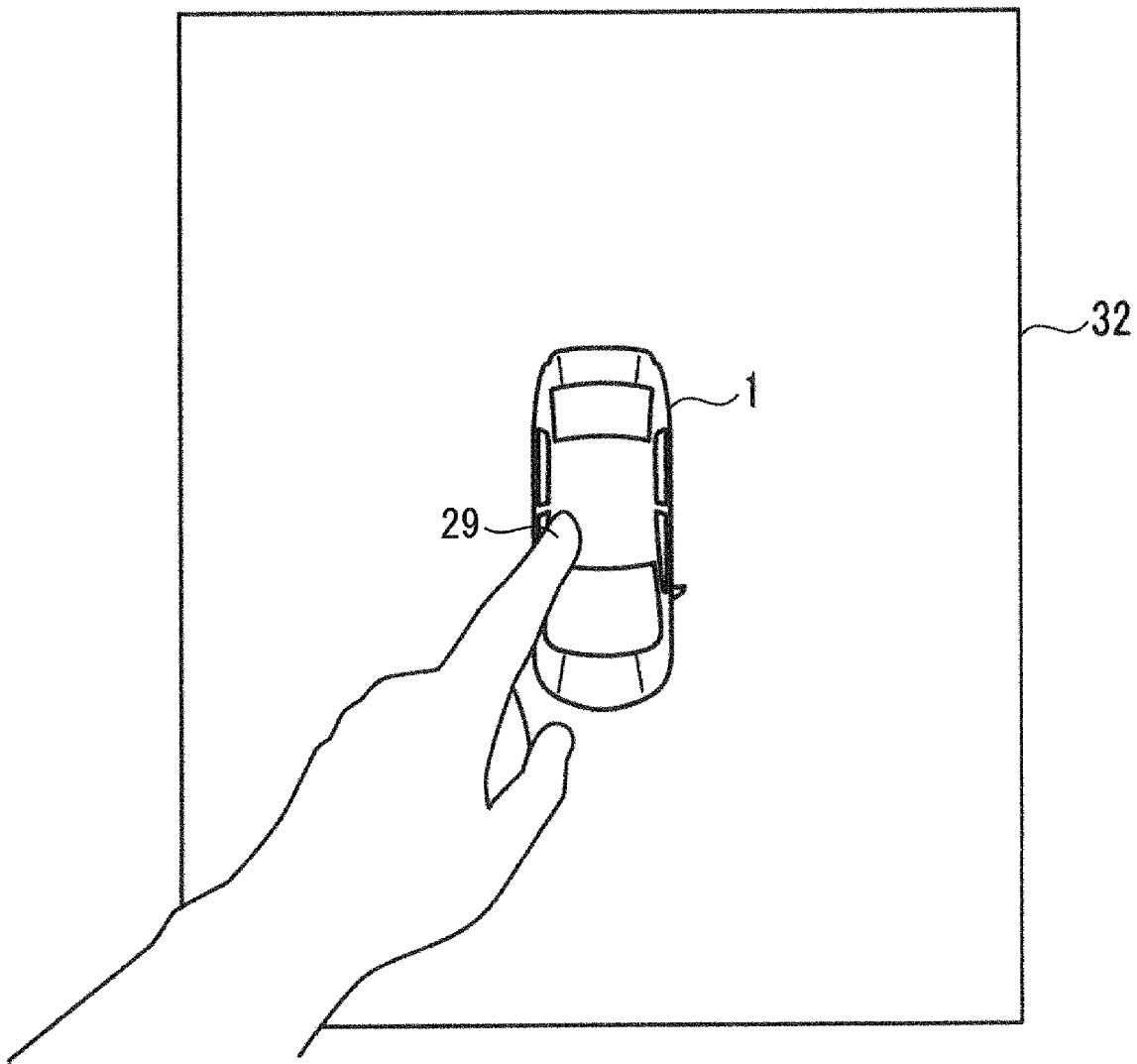

The display control part 38 (see FIG. 3) converts the three-dimensional contour of the acquired target object 1 and the surrounding one to a plan view image, and causes the image display device 32 to display the plan view image. Alternatively, the image display device 32 may convert the three-dimensional contour given by the display control part 38 to a plan view image on a screen surface thereof. In the latter case, the image display device 32 first displays a three-dimensional image on the screen surface as shown in FIG. 5A, and subsequently converts the three-dimensional image to a plan view image on the screen surface as shown in FIG. 5B. In both the cases, the operator can perform designation by a simple touch operation of touching a specific position of the plan view image displayed on the screen surface, e.g., by touching using a finger 29 as shown in FIG. 5B.

Figure 6B:
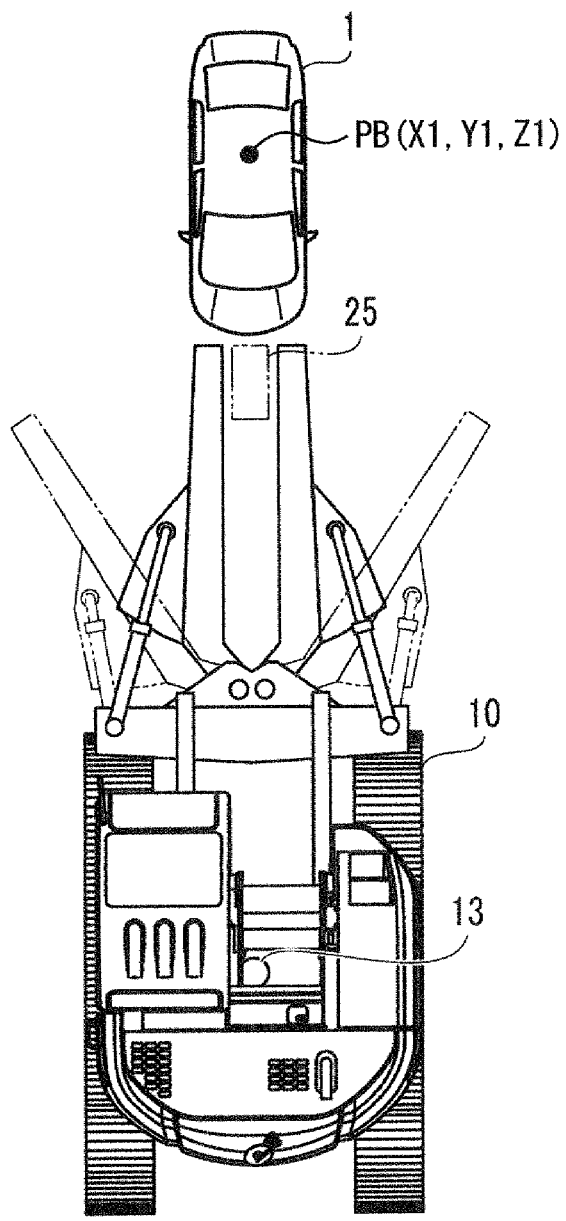
FIG. 6B is a plan view showing an actual target position that is a target position of the crusher in a real space, the actual target position being calculated on the basis of the provisional target position shown in FIG. 6A.

The operator designates by the operation the provisional target position PA (x1, y1) that is a target position (of the crusher 25 in this embodiment) in the virtual space as shown in FIG. 6A. The input interface 33 allows an input of the provisional target position PA (x1, y1) to the target position calculation part 34. The target position calculation part 34 calculates an actual target position PB (X1, Y1, Z1) that is a target position of the attachment in the real space by using the provisional target position PA as shown in FIG. 6B to execute an automatic control of moving the leading end of the attachment 25 to the actual target position PB. When the actual target position PB is corrected in accordance with the difference (α, β, γ), a control of shifting the leading end of the crusher 25 to the corrected actual target position PB is executed.

It is preferable that the component (α, β) of the difference in the XY direction is set so as to render correction of shifting the actual target position PB frontward. Generally, the working device 15 of the construction machine 10 has a heavy weight and thus receives an influence of a large inertia when moving. Therefore, the actual target position that is a destination to which the attachment 25 moves is corrected to shift just in front of a working target position that is a target position in a current working operation, thereby preventing the crusher 25 (or other attachment) from traveling beyond the working target position or suppressing such travelling. This configuration can minimize the manual adjusting operation of the position of the crusher 25 after the execution of the automatic control.

The difference in this embodiment may be set for only a component in a specific direction among the X, Y, and Z directions. For example, under the setting of the difference for only the component in the Z direction with the definition of the difference as "0, 0, γ", the operator can cause the construction machine 10 to execute the automatic control of moving the attachment 25 to a position directly above the working target position that is an original target position by the designation through the input interface 33 without performing individual operations to the operational part 52 for each of the drive device 19, the slewing motor 28, and the plurality of actuators 22, 24, 27. This configuration enables, for example, a sequence of operations that the automatic control makes the position of the crusher (attachment) 25 to approximately coincide with a specific position on the X-Y coordinate, and thereafter, the operator performs a manual operation of moving the crusher 25 downward by utilizing the operational part 52. In other words, rough movement of the crusher (attachment) 25 to the actual target position set directly above the working target position can be simply performed by utilizing the input of the provisional target position through the input interface 33. Thereafter, the operator can perform fine manual operations of sandwiching the target object 1 or excavation (in a case that the attachment is a bucket) and the like while moving the crusher 25 downward by utilizing the operational part 52.

In this embodiment, the display control part 38 or the image display device 32 converts a perspective image based on the three-dimensional contour of the target object 1 and the surrounding one acquired by the display control part 38 to a plan view image, and a provisional target position PA that is a target position in the virtual space is designated on the plan view image. However, the present invention should not be limited thereto. For example, the image based on the three dimensional contour of the target object 1 and the surrounding one acquired by the display control part 38 may be displayed as the perspective image on the image display device 32, and the provisional target position PA that is a target position in the virtual space may be designated on the perspective image. In the latter case, steps S2 and S3 shown in FIG. 4 are omitted.

Next, a second embodiment of the present invention will be described with reference to FIGS. 7 to 10B. The same components as those in the first embodiment among the components in the second embodiment are given with the same reference signs, and the descriptions of the same components may be omitted.

The second embodiment further includes an image taking part 41 shown in FIG. 1. The image taking part 41 is placed at a fixed position and a fixed posture to an upper stewing body 14, and takes an image of a target object 1 around the upper stewing body 14.

Figure 7:
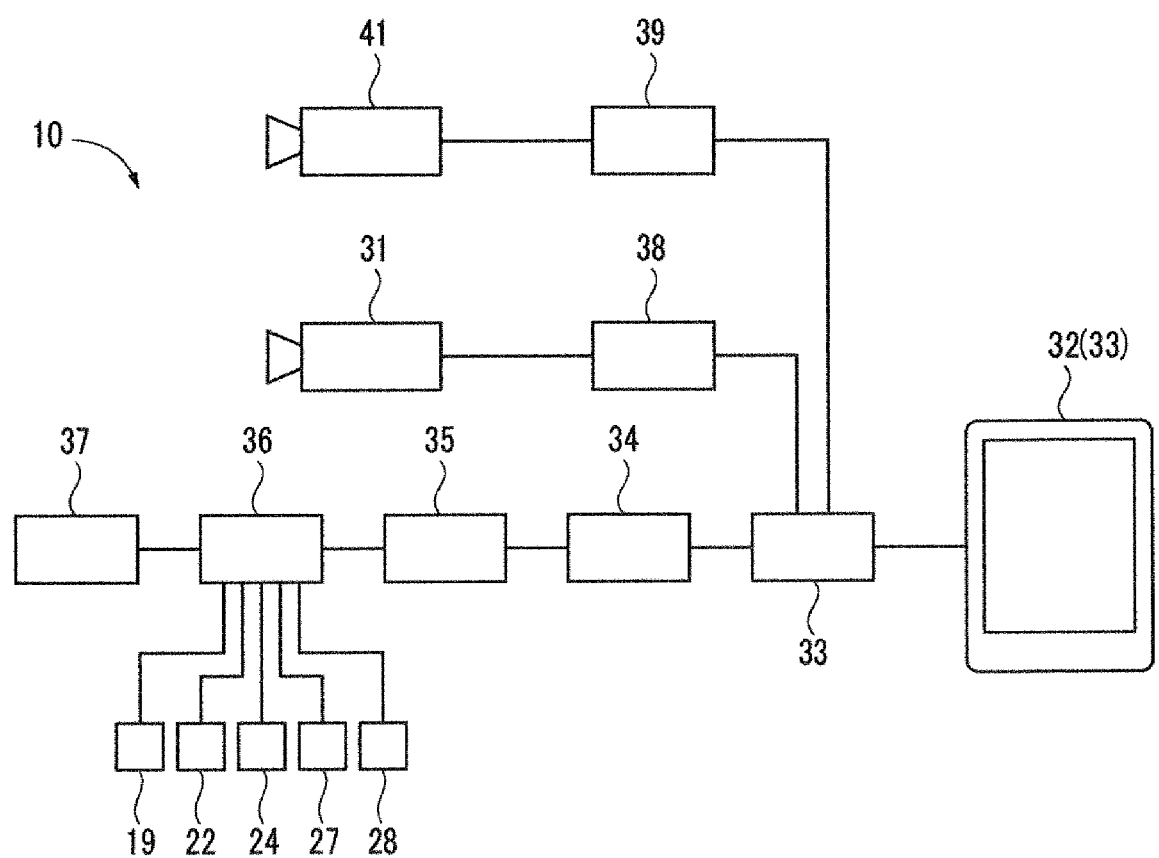
FIG. 7 is a block diagram showing an arithmetic control system according to a second embodiment.

FIG. 7 is a block diagram showing a configuration of an arithmetic control system mounted on a construction machine 10 according to the second embodiment. The arithmetic control system further includes a display control part 39 shown in FIG. 7 in addition to components equivalent to those included in the arithmetic control system in the first embodiment. The display control part 39 causes an image display device 32 constituting an input interface 33 or connected with the input interface 33 to three-dimensionally display an image of a target object 1 (see FIG. 1) taken by the image taking part 41. The image is an image representing a "virtual space" of the present invention.

On the image display device 32, information for use in designation of a provisional target target position that is a target position of a leading end of a crusher (attachment) 25 in a virtual space is input, in the same manner as the first embodiment, to a target position calculation part 34 through the input interface 33 in response to an instructive operation to a specific portion of a displayed image of the target object 1.

Distance information acquired by a three-dimensional measurement part 31 is converted to three-dimensional information and sent to the target position calculation part 34 by the display control part 38 without being displayed on the image display device 32. The distance information acquired by the three-dimensional measurement part 31 may be sent to the target position calculation part 34 without passing through the image display device 32 after the conversion to the three-dimensional information by the display control part 38.

The target position calculation part 34 calculates, on the basis of the specific portion of the image of the target object 1 designated on the image display device 32, a target position corresponding to the specific portion, i.e., a provisional target position designated in the virtual space, in accordance with a correspondence between the plurality of points about which the three-dimensional measurement part 31 acquires the distance information and a plurality of points in the image of the target object 1 taken by the image taking part 41. Moreover, the target position calculation part 34 calculates an actual target position that is a target position of the crusher (attachment) 25 in a real space by using the provisional target position. In other words, the target position calculation part 34 in the second embodiment has a function of calculating, on the basis of the information about the "specific portion" in the input by the input interface 33, the provisional target position PA designated by an operator as well. It is said from the foregoing that "an input of designating a provisional target position of the attachment in a virtual space" in the present invention covers any input of necessary information for specifying the provisional target position (an input about the "specific portion" designated by the operator in the second embodiment) as well as the input of the provisional target position.

Further, a flow of control executed in the second embodiment will be described with reference to the flowchart shown in FIG. 8. The display control part 38 acquires, in step S11, a three-dimensional contour based on distance information about a distance to each of a plurality of points on a surface of the target object 1 and surrounding one acquired by the three-dimensional measurement part 31. In step S12, the display control part 38 sends, to the target position calculation part 34, the information of the three-dimensional contour of the acquired target object 1 and the surrounding one.

The display control part 38 causes, in step S13, the image display device 32 constituting the input interface 33 or connected with the input interface 33 to three-dimensionally display an image of the target object 1 (see FIG. 1) taken by the image taking part 41.

In step S14, a specific portion of the image of the target object 1 is designated on the image display device 32. In step S15, the target position calculation part 34 calculates, on the basis of the input of the specific portion of the target object 1 designated on the image display device 32, a provisional target position corresponding to the input, i.e., a provisional target position PA (x1, y1, z1) that is a target position of the leading end of the crusher 25 and is designated in the virtual space, in accordance with a correspondence between a plurality of points about which the three-dimensional measurement part 31 acquires the distance information and a plurality of points in the image of the target object 1 taken by the image taking part 41.

The target position calculation part 34 further calculates, in step S16, an actual target position PB (X1, Y1, Z1) that is a target position of the leading end of the crusher 25 in the real space in the machine coordinate system by using the provisional target position PA. Besides, the target position calculation part 34 corrects, in step S17, the acquired actual target position PB (X1, Y1, Z1) in accordance with a difference ($\alpha$, $\beta$, $\gamma$) stored in a storage part 37. The control part 36 controls an operation of each of the actuators 19, 22, 24, 27, 28 in such a manner as to shift the crusher 25 to the corrected actual target position PB.

Figure 9A:
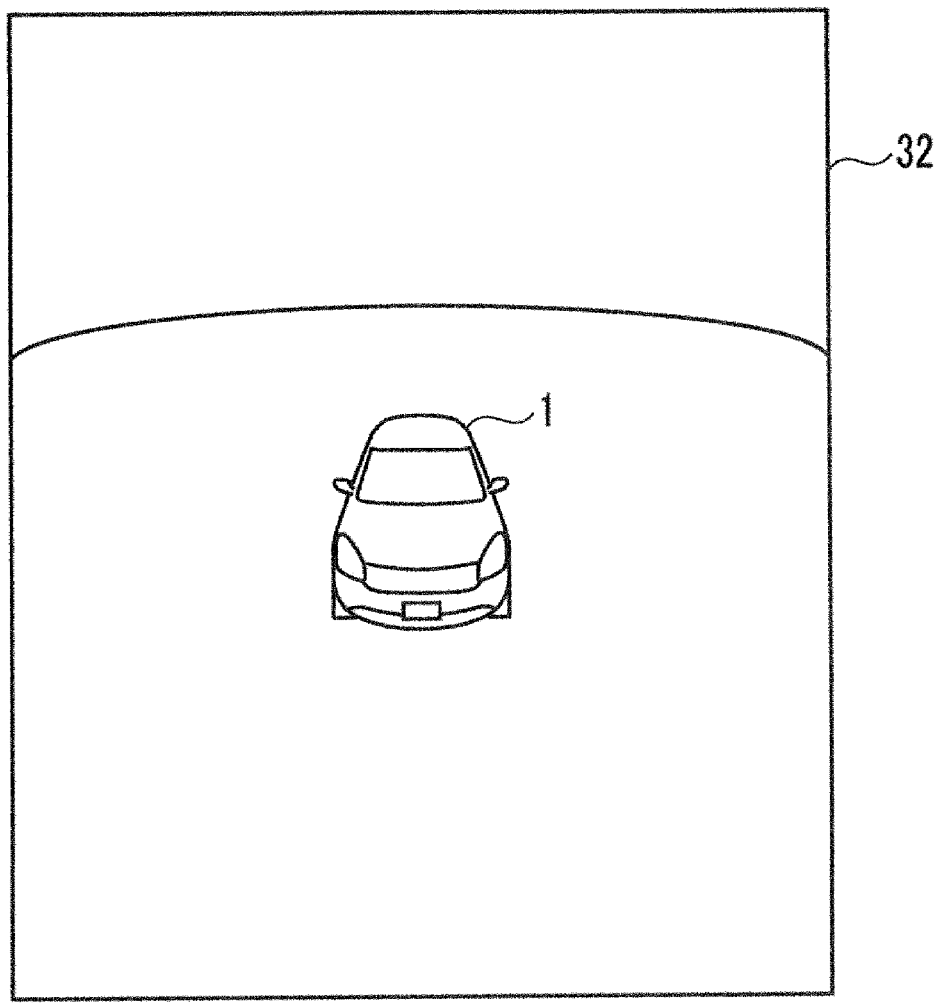
FIG. 9A is a view showing a perspective image of a target object displayed on an image display device according to the second embodiment.
Figure 9B:
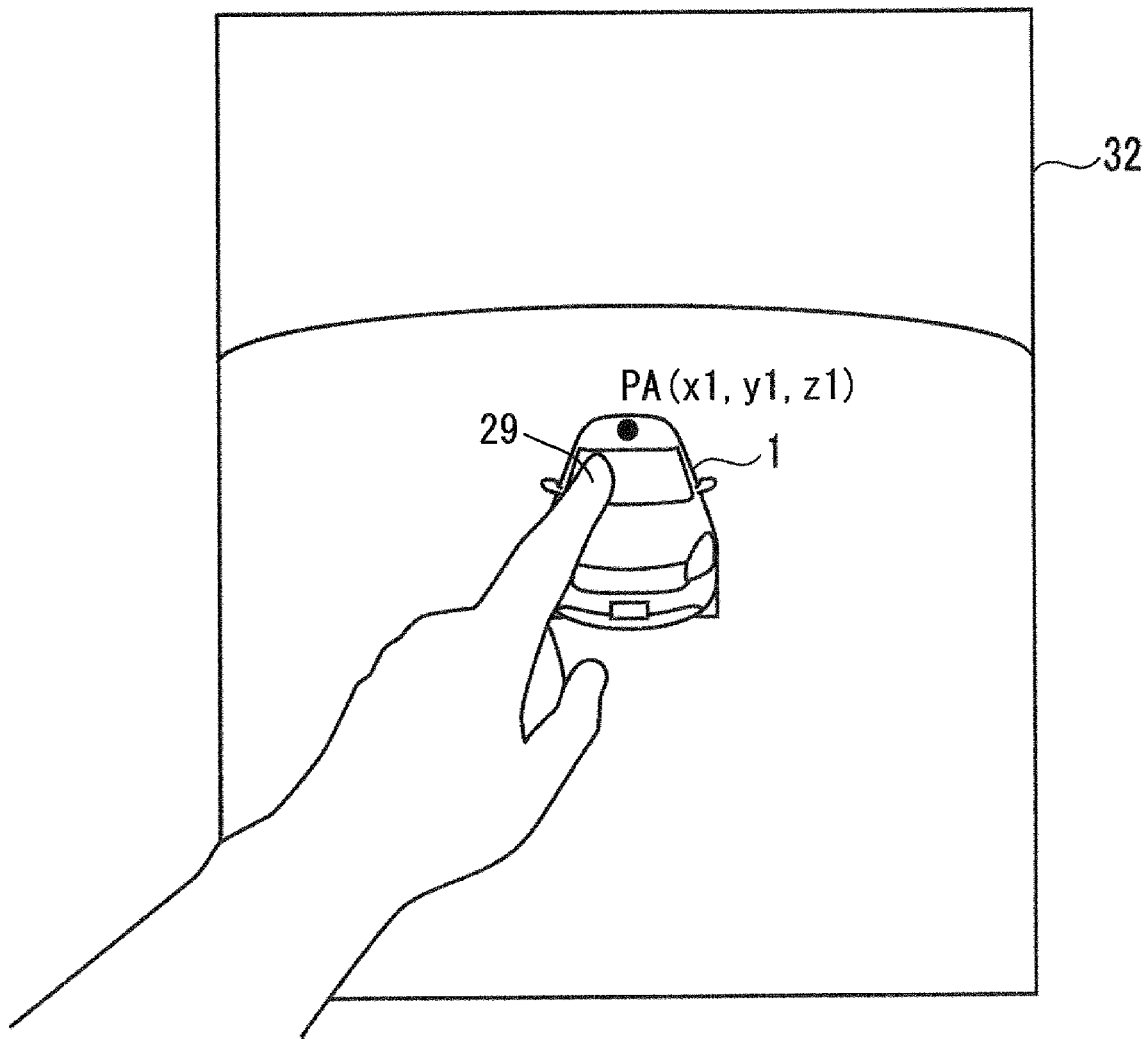

Subsequently, actions of the above-described construction machine 10 will be described. As shown in FIG. 9A, the image display device 32 displays the image of the target object 1 and the surrounding one taken by the image taking part 41 (see FIG. 7) thereon. As shown in FIG. 9B, a specific portion for use in designation of the provisional target position PA (x1, y1, z1) in the virtual space is selected, for example, by a finger 29 of the operator. An input of the specific portion is made to the target position calculation part 34. The target position calculation part 34 calculates a target position corresponding to the specific portion, that is, calculates a provisional target position PA substantially designated by an operation of the operator.

Figure 10A:
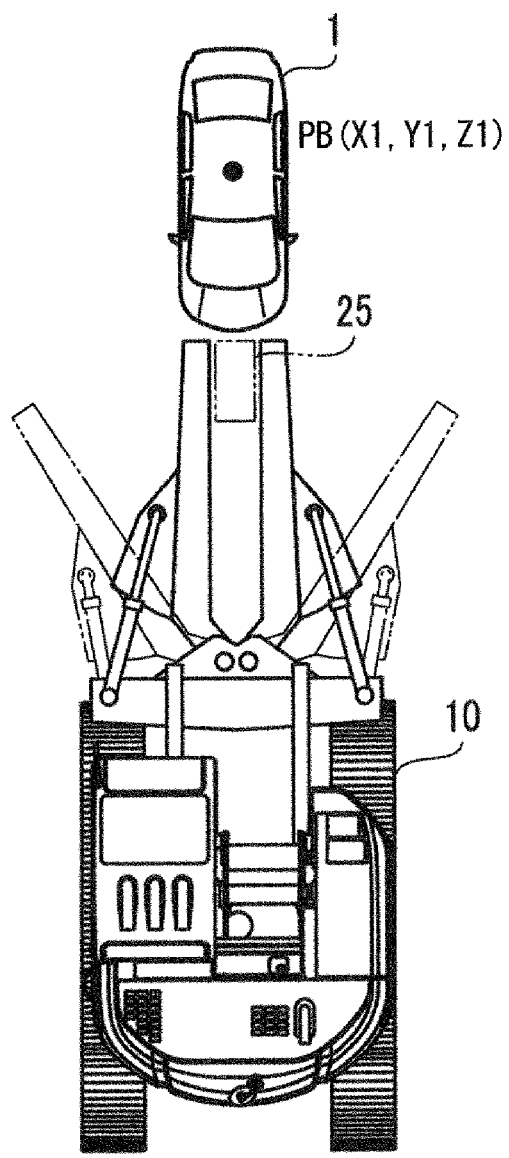
FIG. 10A is a plan view showing an actual target position that is a target position of a crusher in a real space, the actual target position being calculated in the second embodiment.
Figure 10B:
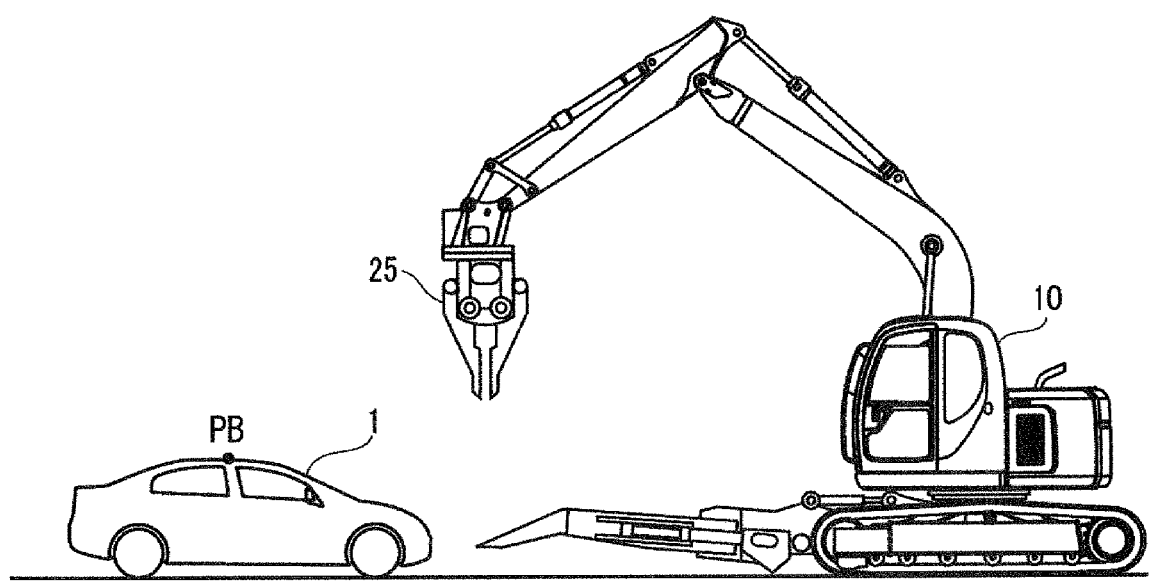
FIG. 10B is a side view showing the actual target position shown in FIG. 10A.

The target position calculation part 34 further calculates an actual target position PB (X1, Y1, Z1) that is a target position in the real space shown in FIGS. 10A and 10B by using the provisional target position PA. Besides, a control of automatically moving the leading end of the attachment 25 to the actual target position PB is executed. In this case, the value of the actual target position PB (Z1, Y1, Z1) may be corrected in accordance with the difference ($\alpha$, $\beta$, $\gamma$), and another control of shifting the leading end of the attachment 25 to the corrected actual target position PB may be executed.

The first and second embodiments achieve an operative assistance enabling an attachment to move easily and rapidly to a target position. The operative assistance is also achievable by a comparative form described below with reference to FIGS. 11 to 14B, the comparative form being different from the embodiments of the present invention. The same components as those in the first embodiment among the components in the comparative form are given with the same reference signs, and the descriptions of the same components may be omitted.

Figure 11A:
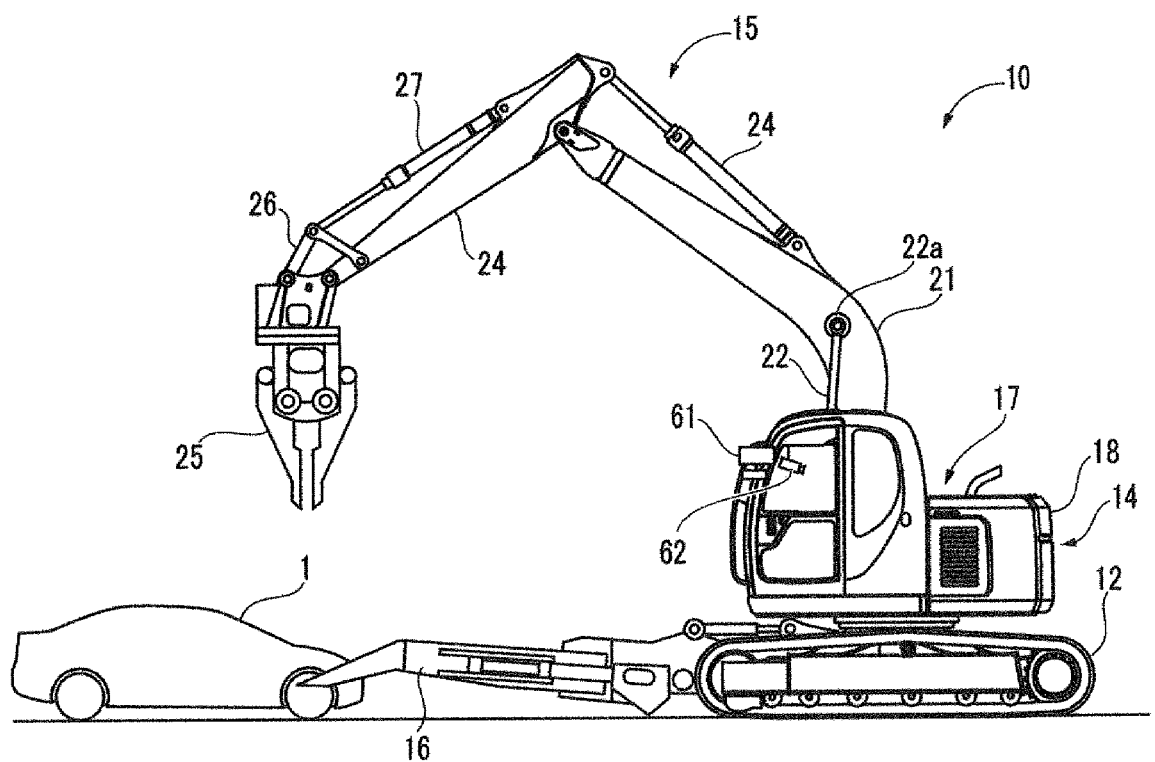
FIG. 11A is a side view of a construction machine according to a comparative form different from the embodiments of the present invention.
Figure 11B:
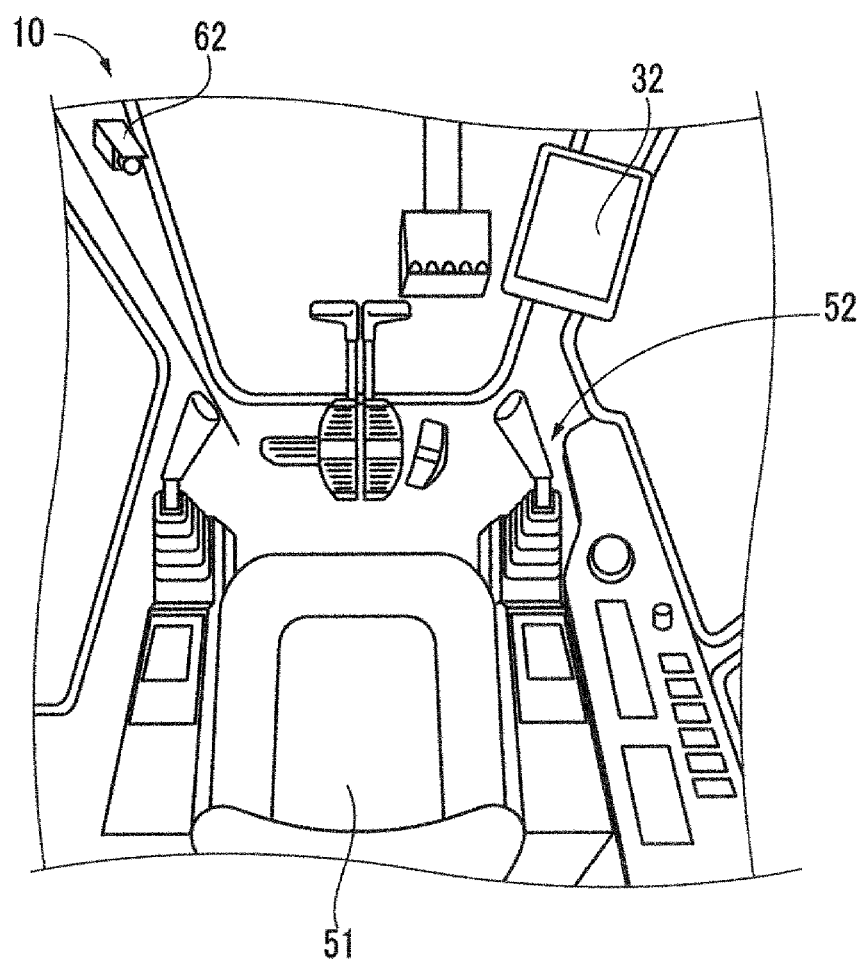
FIG. 11B is a perspective view showing an internal part of an operating chamber of the construction machine shown in FIG. 11A.
Figure 13:
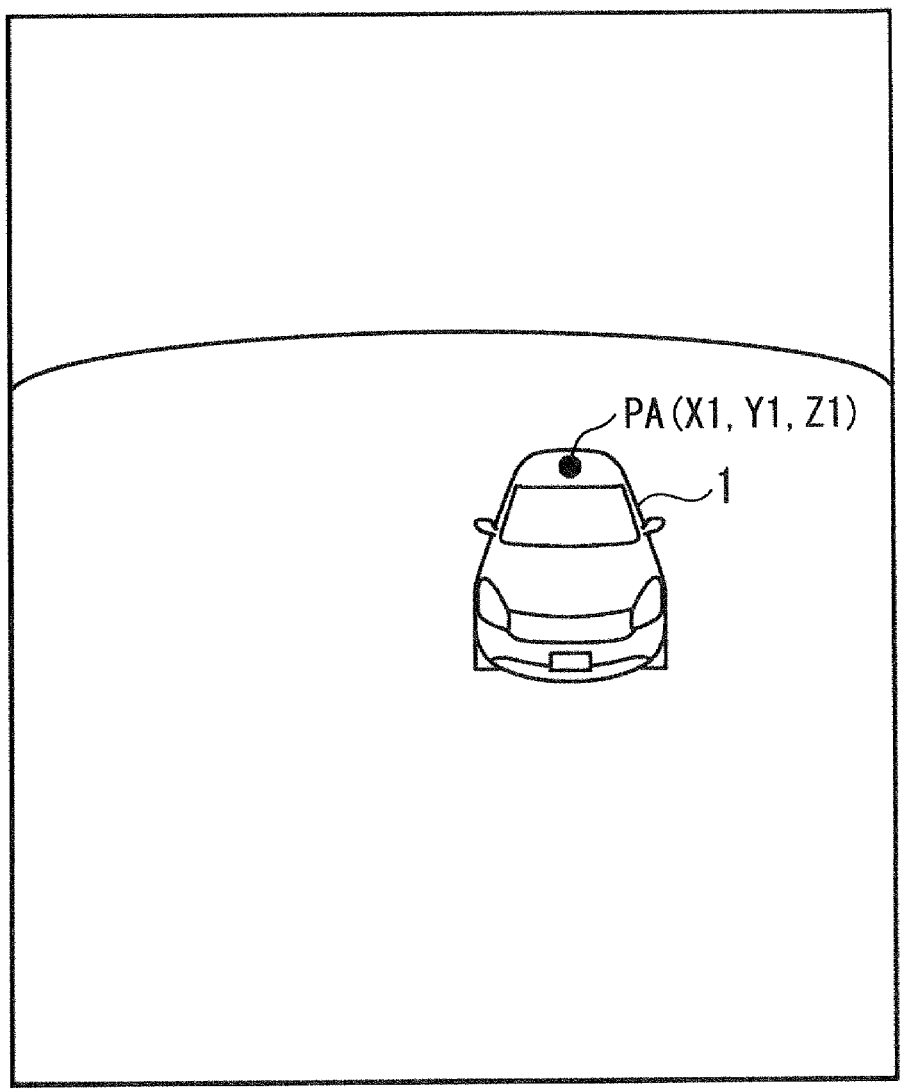
FIG. 13 is a perspective view showing a part of a target object designated in the comparative form.

As shown in FIGS. 11A and 11B, a construction machine 10 according to the comparative form includes: a distance measurement part 61 which is placed at a fixed position and a fixed posture to an upper slewing body 14, and measures a distance to a point on a surface of a target object 1; and a sightline detection part 62 which is placed at a fixed position and a fixed posture to the upper slewing body 14, and detects a sightline direction of an operator.

Next, a flow of control executed in this comparative form will be described with reference to a flowchart shown in FIG. 12. The sightline detection part 62 detects, in step S21, a sightline direction of the operator. A control part 36 in the comparative form calculates, in step S22, an azimuth angle $\theta 1$ between the sightline direction detected by the sightline detection part 62 and a vehicle front and rear direction, and an elevation angle $\theta 2$ between the sightline direction and a horizontal direction.

The control part 36 converts, in step S23, a measurement part coordinate measured by the distance measurement part 61 to a sightline coordinate based on a reference position of a specific portion (e.g., an eye position) of the operator. The distance measurement part 61 measures, in step S24, a distance L from the reference position to the target object 1 in the detected sightline direction on the sightline coordinate.

In step S25, the control part 36 calculates, on the basis of the distance L, the azimuth angle $\theta 1$ and the elevation angle $\theta 2$, a coordinate of a provisional target position PA that is a target position on the sightline coordinate, converts the coordinate of the provisional target position to a target position in a machine coordinate system, that is, an actual target position PB (X, Y, Z) that is a target position in a real space, and controls an operation of each of actuators 19, 22, 24, 27, 28 for moving a leading end of a crusher 25 to the actual target position.

Subsequently, actions of the above-described construction machine 10 will be described. The sightline detection part 62 shown in FIG. 11A detects a position of the target object 1 which the operator watches with his/her eyes for a predetermined time period, that is, detects a sightline to a provisional target position PA shown in FIG. 13.

Figure 14A:
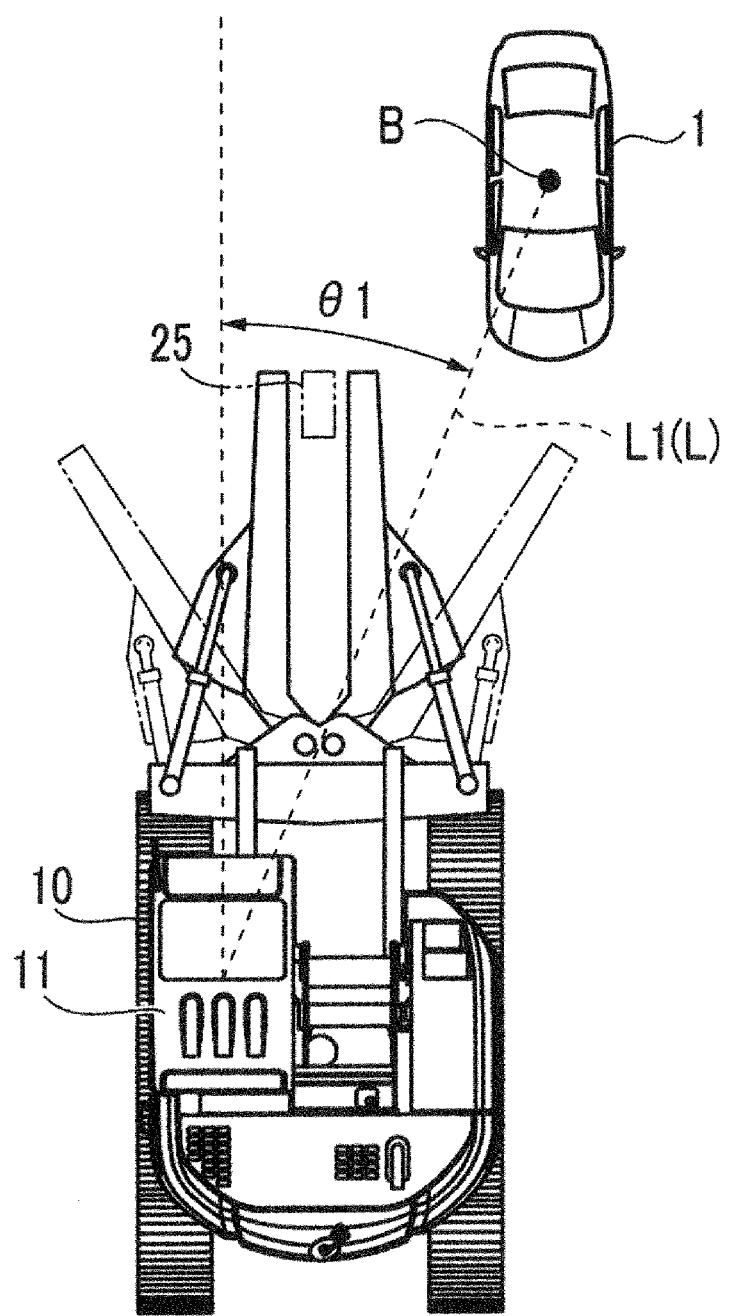
FIG. 14A is a plan view showing an actual target position that is a target position of a crusher in a real space, the actual target position being calculated on the basis of a provisional target position shown in FIG. 13.
Figure 14B:
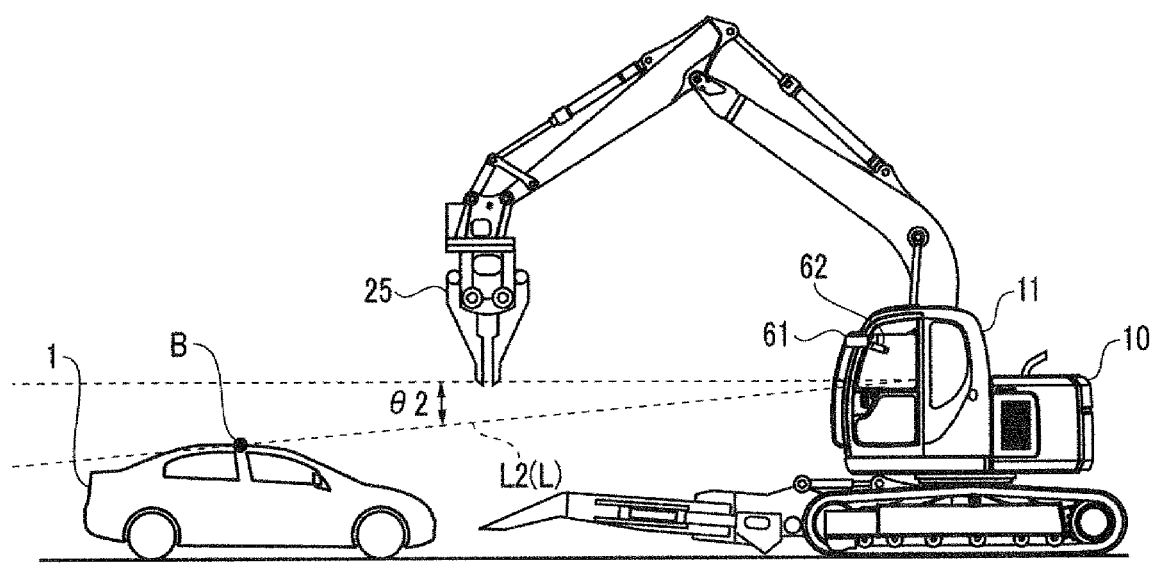
FIG. 14B is a side view showing the actual target position shown in FIG. 14A.

In FIGS. 14A and 14B, a vehicle width direction of the construction machine 10 is defined as an X coordinate, a vehicle front and rear direction thereof is defined as a Y coordinate, and a height direction thereof is defined as a Z coordinate. A projective distance in a plan view (on an X-Y plane) of the distance L is denoted by L1 in FIG. 14A. Another projective distance in a side view (on a Y-Z plane) of the distance L is denoted by L2 in FIG. 14B. As shown in FIGS. 14A, 14B, the distance L in the sight direction of the detected azimuth angle $\theta 1$ and elevation $\theta 2$ on the sightline coordinate is measured.

The X coordinate of the provisional target position PA that is a target position on the sightline coordinate, the Y coordinate thereof, and the Z coordinate thereof can be respectively expressed as follows:

$$X1 = L1x \sin \theta 1 = L \times \cos \theta 2x \sin \theta 1;$$

$$Y1 = L1 \times \cos \theta 1 = L \times \cos \theta 2 \times \cos \theta 1; \text{ and}$$

$$Z1 = -L2 \times \sin \theta 2 = -L \times \cos \theta 1 \times \sin \theta 2.$$

The control part 36 converts the coordinate of the provisional target position PA to a machine coordinate, and controls each of actuators 19, 22, 24, 27, 28 to move the leading end of the crusher 25 to an actual target position PB (X, Y, Z) that is a target position of the machine coordinate.

According to the first and second embodiments, the target position calculation part 34 calculates the actual target position that is a target position of the attachment (crusher 25 in the embodiments) in the real space by using the provisional target position corresponding to an input permitted by the input interface 33, i.e., the provisional target position that is a target position designated in the virtual space. The operational amount calculation part 35 calculates, as a target operational amount, an operational amount of at least one of the lower traveling body 12, the upper slewing body 14, the working device 15, and the attachment 25 to make a current position of the attachment (crusher 25) coincide with the actual target position. Further, the control part 36 controls an operation of at least one of the drive device, the slewing motor, and the plurality of actuators in accordance with the target operational amount calculated by the operational amount calculation part 35. This configuration allows the operator to easily move the attachment 25 to the actual target position that is a target position in the real space without performing individual operations to the operational part 52 for each of the traveling drive device 19, the slewing motor 28, and the plurality of actuators 22, 24, 27. In other words, the construction machine 10 according to the first and second embodiments can perform to the operator an effectively operative assistance enabling the attachment (crusher 25) to easily and rapidly move to the target position.

Specifically, in the first embodiment, the three-dimensional measurement part 31 acquires distance information about a distance to each of a plurality of points on a surface of a target object around the construction machine 10. The display control part 38 causes, on the basis of the acquired distance information, the image display device 32 constituting the input interface 33 or connected with the input interface 33 to three-dimensionally display an image of the target object. The provisional target position is designated to the input interface 33 owing to designation of a specific portion of the image of the target object 1 that is three-dimensionally displayed on the image display device 32, the provisional target position being a target position of the attachment (crusher 25) in the virtual space. Further, the actual target position that is a target position in the real space is specified by using the provisional target position. This allows the operator to ultimately designate the actual target position only by a simple designative operation of designating a target position in the three-dimensionally image displayed on the image display device 32.

Moreover, the display control part 38 converts the three-dimensional contour of the target object 1 based on the distance information acquired by the three-dimensional measurement part 31 to a plan view image, and causes the image display device 32 to display the plan view. Accordingly, the operator can clearly and easily designate the provisional target position in the plan view image.

Next, in the second embodiment, the three-dimensional measurement part 31 acquires distance information about a distance to each of a plurality of points on a surface of a target object around the construction machine 10. The image taking part 41 takes an image of the target object 1 around the construction machine 10. The display control part 39 causes the image display device 32 to three-dimensionally display the taken image of the target object 1. The target position calculation part 34 calculates, on the basis of a specific portion of the image of the target object 1 designated on the image display device 32, a provisional target position corresponding to the specific portion, i.e., a provisional target position designated in the virtual space, in accordance with a correspondence between a plurality of points about which the three-dimensional measurement part 31 acquires the distance information and a plurality of points in the image of the target object 1 taken by the image taking part 41. The target position calculation part 34 further calculates an actual target position that is a target position of the attachment 25 in the real space. This allows the operator to ultimately designate the actual target position that is a target position of the attachment (crusher 25) in the real space by a simple designative operation of only designating a specific portion of an easily recognizable image displayed on the image display device 32, i.e., an image actually taken by the image taking part 41.

The image display device 32 in the first and second embodiments includes a touch panel having a screen surface to be touched by the operator, and allows the operator to specify the provisional target position on the basis of a touched position by the operator on the screen surface. Thus, the operator can directly designate the provisional target position by a finger 29 on the image display device 32. This configuration including the image display device 32 serving as an instructive device as well can achieve a reduction in the number of components by excluding an operative lever and a mouse which are unnecessary. Moreover, use of a commercially available tablet as the touch panel further contributes to cost reduction in the components.

The construction machine 10 according to the first and second embodiments further includes the storage part 37 which stores the machine body information about the machine body thereof. This configuration achieves an operative control involving the weight, or the reach of the working device 15 to move the attachment (crusher 25) to the actual target position.

The storage part 37 stores in advance, for example, the weight and the dimension of each of the boom 21 and the arm 23 constituting the working device 15 as the machine information. This configuration achieves another operative control involving the gravity center of the working device 15, the reach from the upper slewing body 14 to the attachment (crusher 25) or the like when the working device 15 is operated.

Furthermore, the storage part 37 contributes to automatic correction of the actual target position PB by storing the difference. For example, the storage part 37 can contribute, by storing such a difference that the actual target position is higher than a current working target position only by a predetermined distance, to a control of automatically moving the attachment (crusher 25) from the working target position of the target object 1 to the actual target position offset upward at a predetermined distance.

In the case that the input interface 33 is configured to permit an input of the difference, the operator can designate the difference in accordance with a preference thereof. Consequently, the operability can be improved.

For instance, in the case that the storage part 37 is configured to store a plurality of types of working content and the difference determined for each of the plurality of types of working content, and the input interface 33 is configured to permit input about at least the plurality of types of working content, the operator can automatically set, only by an operation of designating excavation or the like as a specific type of working content, an actual target position suitable for the excavation.

Meanwhile, although the provisional target position is designated on the image display device 32, and the control part 36 controls the actuators 19, 22, 24, 27, 28 in the embodiments, the way of operative assistance is not limited thereto. For example, a different form from the embodiments may include an operational part 52 for an operation to a position and an action of the attachment 25 at only the leading end thereof. The control part 36 may calculate a control amount of each of the plurality of actuators 19, 22, 24, 27, 28 of the working device 15 and the like to execute operative information input via the operational part 52, and control the actuators in accordance with the calculated control amount. In this case, it is sufficient that the operator operates the operational part 52 only for the attachment 25. In this way, the control amount of each of the plurality of actuators of the working device 15 is automatically calculated. Consequently, the operation of the plurality of actuators is controlled in accordance with the calculated control amount.

The target position calculation part 34, the operational amount calculation part 35, the storage part 37, and the display control parts 38, 39 in the embodiments may be configured as structural components independent from the control part 36. Alternatively, a single controller has the functions of the target position calculation part 34, the operational amount calculation part 35, the storage part 37, and the display control parts 38, 39 in combination with the function of the control part 36.

As described, provided is a construction machine, such as a hydraulic excavator, which can perform an operative assistance enabling an attachment to easily and rapidly move to a target position. The construction machine includes: a lower traveling body; a traveling drive device which is an actuator for driving the lower traveling body in such a way as to cause the lower traveling body to perform a traveling action; an upper slewing body slewably mounted on the lower traveling body; a slewing motor which is an actuator for slewing the upper slewing body; a working device swingably coupled to the upper slewing body; an attachment coupled to a leading end of the working device; a plurality of working actuators which are actuators for driving the attachment and the working device respectively; an input interface which permits an input of designating a provisional target position of the attachment in a virtual space; a target position calculation part which calculates an actual target position that is a target position of the attachment in a real space by using the provisional target position corresponding to the input permitted by the input interface; an operational amount calculation part which calculates a target operational amount that is an operational amount required to make a current position of the attachment coincide with the actual target position with respect to at least one driven target selected from the lower traveling body, the slewing body, the working device, and the attachment; and a control part which controls an operation of an actuator for driving the driven target among the traveling drive device, the slewing motor, and the plurality of working actuators in accordance with the target operational amount calculated by the operational amount calculation part.

According to the construction machine, an operator can automatically move the attachment to the actual target position that is a target position in the real space by designating the provisional target position of the attachment in the virtual space in response to the input permitted by the input interface without performing individual operations to the operational part for each of the drive device, the slewing motor, and the plurality of actuators. In other words, the construction machine can perform, to the operator, an effectively operative assistance enabling the attachment to easily and rapidly move to the target position.

The input interface preferably includes an image display device which displays an image for use in designation of the provisional target position in the virtual space. Alternatively, the construction machine preferably further includes: an image display device which displays an image for use in designation of the provisional target position in the virtual space, the image display device being connected with the input interface.

In the configuration including the image display device, the construction machine preferably further includes: a three-dimensional measurement part which is placed at a fixed position and a fixed posture to at least one of the upper slewing body and a specific location around the upper slewing body, and acquires distance information about a distance to each of a plurality of points on a surface of a target object around the construction machine; and a display control part which causes, on the basis of the distance information acquired by the three-dimensional measurement part, the image display device to three-dimensionally display an image of the target object, wherein the input interface is configured to permit the input of the provisional target position in the virtual space by an operation of designating a specific portion of the image of the target object three-dimensionally displayed on the image display device.

According to the construction machine, the operator can easily designate the provisional target position in the three-dimensional image displayed on the image display device.

In this case, it is preferable that the display control part converts a three-dimensional contour of the target object on the basis of the distance information acquired by the three-dimensional measurement part to a plan view image, and displays the plan view image on the image display device, and the input interface is configured to permit the input of the provisional target position in the virtual space by an operation of designating a specific portion of the plan view image of the target object displayed on the image display device In this configuration, the operator can clearly and easily designate the provisional target position in the plan view image displayed on the image display device.

Alternatively, the construction machine preferably further includes: a three-dimensional measurement part which is placed at a fixed position and a fixed posture to the upper slewing body, and acquires distance information about a distance to each of a plurality of points on a surface of a target object around the construction machine; an image taking part which is placed at a fixed position and a fixed posture to the upper slewing body, and takes an image of a target object around the construction machine; and a display control part which causes the image display device to three-dimensionally display the image of the target object taken by the image taking part, wherein the input interface is configured to permit an input of a designated specific portion of the image of the target object displayed on the image display device into the target position calculation part by an operation of designating the specific portion, and the target position calculation part is configured to calculate, on the basis of the input, the designated provisional target position and the actual target position corresponding to the provisional target position in accordance with a respective correspondence between the plurality of points about which the three-dimensional measurement part acquires the distance information and a plurality of points in the image of the target object taken by the image taking part.

In this configuration, the operator can designate the provisional target position by a simple operation of only designating a specific portion in an easily recognizable image displayed on the image display device, i.e., an image actually taken by the image taking part 41.

The image display device preferably includes a touch panel which has a screen surface to be touched by an operator, and allows the operator to specify the provisional target position on the basis of a touched position by the operator on the screen surface.

The image display device including the touch panel permits the operator to designate the provisional target position by a simple operation of only directly touching the image by, for example, a finger thereof. Besides, the image display device including the touch panel can serve as a device for instructing the provisional target position. In this configuration, a special device, e.g., an operative lever and a mouse, for use in designation of the provisional target position is unnecessary. Thus, the number of components can be reduced. Additionally, use of a commercially available tablet, for example, as the touch panel further contributes to cost reduction in the components.

The construction machine preferably further includes: a storage part which stores machine body information about a machine body of the construction machine, wherein the control part corrects a control amount of each of the traveling drive device, the clewing motor, and the plurality of working actuators on the basis of the machine body information stored in the storage part.

Since the storage part stores the machine body information, the control part can perform an operative control involving the machine body information, e.g., a control involving the weight of the machine body or the reach of the working device, to enable the attachment to move to the actual target position.

The machine body information preferably includes a weight of the machine body, a gravity center of the machine body, and a dimension of the working device.

The machine body information enables the control part to perform a control involving, for example, the gravity center of the operating working device or the reach from the slewing body to the attachment.

It is preferable that the storage part is configured to store a difference for correcting the actual target position, and the control part is configured to correct a value of the actual target position in accordance with the difference.

The difference contributes to the correction of the actual target position. For example, it is possible to automatically move the attachment to a position offset upward only at a predetermined distance from the target object by causing the storage part to store such a difference that the actual target position is higher than the real target position, e.g., the current position of the target, only by a predetermined distance.

For instance, the difference preferably has such a value as to make the actual target position coincide with a position directly above the working target position that is an original target position.

The difference enables an operation that, after allowing the attachment to move to the position above the working target position in the real space and to have a determined horizontal position without performing individual operations to the operational part by the operator for the drive device, the slewing motor, and the plurality of actuators, the operator performs individual operations of moving the attachment downward. In other words, the movement of the attachment to the actual target position set directly above the working target position can be automatically performed. The subsequent operations accompanying the attachment lowering can be finely performed by the manual operation.

It is preferable that the input interface is configured to permit an input of the difference to the target position calculation part. This configuration permits the operator to designate the difference in accordance with a preference thereof.

It is preferable that the storage part is configured to store a plurality of types of working content and the difference determined for each of the plurality of types of working content, and the input interface is configured to permit input about at least the plurality of types of working content.

This configuration permits the operator to designate specific one of the plurality of types of working content. In this manner, the control part can automatically correct the actual target position in accordance with the difference suitable for the specific one type of working content. In other words, the difference can be indirectly designated by designation of the specific type of working content.

The invention claimed is:

1. A construction machine comprising:
   a lower traveling body;
   a traveling drive device which is an actuator for driving the lower traveling body in such a way as to cause the lower traveling body to perform a traveling action;
   an upper slewing body slewably mounted on the lower traveling body;
   a slewing motor which is an actuator for slewing the upper slewing body;
   a working device swingably coupled to the upper slewing body;
   an attachment coupled to a leading end of the working device;
   a plurality of working actuators which are actuators for driving the attachment and the working device respectively;
   an input interface which permits an input of designating a provisional target position of the attachment in a virtual space;
   a target position calculation part which calculates an actual target position that is a target position of the attachment in a real space by using the provisional target position corresponding to the input permitted by the input interface;
   an operational amount calculation part which calculates a target operational amount that is an operational amount required to make a current position of the attachment coincide with the actual target position with respect to at least one driven target selected from the lower traveling body, the slewing body, the working device, and the attachment; and
   a control part which controls an operation of an actuators for driving the driven target among the traveling drive device, the slewing motor, and the plurality of working actuators in accordance with the target operational amount calculated by the operational amount calculation part.

2. The construction machine according to claim 1, wherein
   the input interface includes an image display device which displays an image for use in designation of the provisional target position in the virtual space.

3. The construction machine according to claim 2, further comprising:
   a three-dimensional measurement part which is placed at a fixed position and a fixed posture to at least one of the upper slewing body and a specific location around the upper slewing body, and acquires distance information about a distance to each of a plurality of points on a surface of a target object around the construction machine; and a display control part which causes, on the basis of the distance information acquired by the three-dimensional measurement part, the image display device to three-dimensionally display an image of the target object, wherein the input interface is configured to permit the input of the provisional target position in the virtual space by an operation of designating a specific portion of the image of the target object three-dimensionally displayed on the image display device.

4. The construction machine according to claim 3, wherein the display control part converts a three-dimensional contour of the target object on the basis of the distance information acquired by the three-dimensional measurement part to a plan view image, and displays the plan view image on the image display device, and the input interface is configured to permit the input of the provisional target position in the virtual space by an operation of designating a specific portion of the plan view image of the target object displayed on the image display device.

5. The construction machine according to claim 2, further comprising:

a three-dimensional measurement part which is placed at a fixed position and a fixed posture to the upper slewing body, and acquires distance information about a distance to each of a plurality of points on a surface of a target object around the upper slewing body;

an image taking part which is placed at a fixed position and a fixed posture to the upper slewing body, and takes an image of a target object around the upper slewing body; and a display control part which causes the image display device to three-dimensionally display the image of the target object taken by the image taking part, wherein the input interface is configured to permit an input of a designated specific portion of the image of the target object displayed on the image display device into the target position calculation part by an operation of designating the specific portion, and the target position calculation part is configured to calculate, on the basis of the input, the designated provisional target position and the actual target position corresponding to the provisional target position in accordance with a respective correspondence between the plurality of points about which the three-dimensional measurement part acquires the distance information and a plurality of points in the image of the target object taken by the image taking part.

6. The construction machine according to claim 4, wherein the image display device includes a touch panel which has a screen surface to be touched by an operator, and allows the operator to specify the provisional target position on the basis of a touched position by the operator on the screen surface.

7. The construction machine according to claim 1, further comprising:

an image display device which displays an image for use in designation of the provisional target position in the virtual space, the image display device being connected with the input interface.

8. The construction machine according to claim 7, further comprising:

a three-dimensional measurement part which is placed at a fixed position and a fixed posture to at least one of the upper slewing body and a specific location around the upper slewing body, and acquires distance information about a distance to each of a plurality of points on a surface of a target object around the construction machine; and a display control part which causes, on the basis of the distance information acquired by the three-dimensional measurement part, the image display device to three-dimensionally display an image of the target object, wherein the input interface is configured to permit the input of the provisional target position in the virtual space by an operation of designating a specific portion of the image of the target object three-dimensionally displayed on the image display device.

9. The construction machine according to claim 8, wherein the display control part converts a three-dimensional contour of the target object on the basis of the distance information acquired by the three-dimensional measurement part to a plan view image, and displays the plan view image on the image display device, and the input interface is configured to permit the input of the provisional target position in the virtual space by an operation of designating a specific portion of the plan view image of the target object displayed on the image display device.

10. The construction machine according to claim 7, further comprising:

a three-dimensional measurement part which is placed at a fixed position and a fixed posture to the upper slewing body, and acquires distance information about a distance to each of a plurality of points on a surface of a target object around the upper slewing body;

an image taking part which is placed at a fixed position and a fixed posture to the upper slewing body, and takes an image of a target object around the upper slewing body; and a display control part which causes the image display device to three-dimensionally display the image of the target object taken by the image taking part, wherein the input interface is configured to permit an input of a designated specific portion of the image of the target object displayed on the image display device into the target position calculation part by an operation of designating the specific portion, and the target position calculation part is configured to calculate, on the basis of the input, the designated provisional target position and the actual target position corresponding to the provisional target position in accordance with a respective correspondence between the plurality of points about which the three-dimensional measurement part acquires the distance information and a plurality of points in the image of the target object taken by the image taking part.

11. The construction machine according to claim 9, wherein the image display device includes a touch panel which has a screen surface to be touched by an operator, and allows the operator to specify the provisional target position on the basis of a touched position by the operator on the screen surface.

12. The construction machine according to claim 6, further comprising:
   a storage part which stores machine body information about a machine body of the construction machine, wherein
   the control part corrects a control amount of each of the traveling drive device, the slewing motor, and the plurality of working actuators on the basis of the machine body information stored in the storage part.

13. The construction machine according to claim 12, wherein
   the machine body information includes a weight of the machine body, a gravity center of the machine body, and a dimension of the working device.

14. The construction machine according to claim 12, wherein
   the storage part is configured to store a difference for correcting the actual target position, and
   the control part is configured to correct a value of the actual target position in accordance with the difference.

15. The construction machine according to claim 14, wherein
   the input interface is configured to permit an input of the difference to the target position calculation part.

16. The construction machine according to claim 14, wherein
   the storage part is configured to store a plurality of types of working content and the difference determined for each of the plurality of types of working content, and
   the input interface is configured to permit input about at least the plurality of types of working content.

* * * * *